US011113346B2

(12) United States Patent
Jehan et al.

(10) Patent No.: US 11,113,346 B2
(45) Date of Patent: Sep. 7, 2021

(54) SEARCH MEDIA CONTENT BASED UPON TEMPO

(71) Applicant: Spotify AB, Stockholm (SE)

(72) Inventors: Tristan Jehan, Brooklyn, NY (US); Nicola Montecchio, New York, NY (US)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 15/617,891

(22) Filed: Jun. 8, 2017

(65) Prior Publication Data

US 2018/0129745 A1    May 10, 2018

Related U.S. Application Data

(60) Provisional application No. 62/347,651, filed on Jun. 9, 2016.

(51) Int. Cl.
*G06F 16/638* (2019.01)
*G06F 16/9535* (2019.01)
(Continued)

(52) U.S. Cl.
CPC .......... *G06F 16/9535* (2019.01); *G06F 16/41* (2019.01); *G06F 16/639* (2019.01); *G06F 16/683* (2019.01); *G06N 20/00* (2019.01)

(58) Field of Classification Search
CPC ......... G06F 17/30867; G06F 17/30743; G06F 17/30772; G06F 17/3002; G06F 16/9535;
(Continued)

(56) References Cited

U.S. PATENT DOCUMENTS 8,101,843 B2    1/2012   Turner
8,254,829 B1    8/2012   Kindred et al.
(Continued)

FOREIGN PATENT DOCUMENTS

EP    1 705 588 A1    9/2006
EP    1821309 A1      8/2007
(Continued)

OTHER PUBLICATIONS

Geoffray Bonnin et al: "Automated Generation of Music Playlists: Survey and Experiments", ACM Computing Surveys., vol. 47, No. 2, Nov. 12, 2014 (Nov. 12, 2014), pp. 1-35.
(Continued)

*Primary Examiner* — Aleksandr Kerzhner
*Assistant Examiner* — Maher N Algibhah
(74) *Attorney, Agent, or Firm* — Merchant & Gould P.C.

(57) ABSTRACT

A media system includes: a media-playback device including: a media-output device that plays media content items; and a tempo control engine to: select media content based upon suitability for a repetitive-motion activity; place each media content item from the media content into two or more pools of media content, with a first pool including media content which the user has previously indicated as being relevant, and a second pool including media content that the user has not previously indicated as being relevant; and sort the media content in each of the first pool and the second pool based upon tempo.

22 Claims, 17 Drawing Sheets

(51) Int. Cl.
*G06F 16/683* (2019.01)
*G06F 16/41* (2019.01)
*G06N 20/00* (2019.01)

(58) Field of Classification Search
CPC ...... G06F 16/41; G06F 16/638; G06F 16/683; G06N 99/005; G06N 20/00
See application file for complete search history.

(56) References Cited

U.S. PATENT DOCUMENTS

| | | | |
|---|---|---|---|
| 8,626,607 | B1 | 1/2014 | Wood et al. |
| 8,688,716 | B1 | 4/2014 | DuHadway et al. |
| 8,704,068 | B2 * | 4/2014 | Bowen ............... A63B 71/0686 84/612 |
| 9,361,353 | B1 | 6/2016 | Aristides |
| 9,503,500 | B2 | 11/2016 | Bernhardsson et al. |
| 9,788,777 | B1 | 10/2017 | Knight et al. |
| 10,114,607 | B1 * | 10/2018 | Riggs-Zeigen ......... G06F 3/165 |
| 2003/0205124 | A1 | 11/2003 | Foote et al. |
| 2005/0020223 | A1 | 1/2005 | Ellis et al. |
| 2005/0211072 | A1 | 9/2005 | Lu et al. |
| 2005/0223879 | A1 | 10/2005 | Huffman |
| 2006/0080356 | A1 | 4/2006 | Burges et al. |
| 2006/0107822 | A1 * | 5/2006 | Bowen .................. G10H 1/40 84/612 |
| 2006/0195462 | A1 | 8/2006 | Rogers |
| 2006/0230065 | A1 | 10/2006 | Plastina et al. |
| 2006/0243120 | A1 | 11/2006 | Takai et al. |
| 2006/0276919 | A1 | 12/2006 | Shirai et al. |
| 2007/0044641 | A1 | 3/2007 | McKinney et al. |
| 2007/0074617 | A1 * | 4/2007 | Vergo ............... G06F 17/30743 84/612 |
| 2007/0074618 | A1 | 4/2007 | Vergo |
| 2007/0074619 | A1 | 4/2007 | Vergo |
| 2007/0079691 | A1 | 4/2007 | Turner |
| 2007/0118043 | A1 | 5/2007 | Oliver et al. |
| 2007/0174274 | A1 | 7/2007 | Kim |
| 2007/0203421 | A1 * | 8/2007 | Cho .................... A61B 5/0002 600/519 |
| 2007/0204744 | A1 | 9/2007 | Sako et al. |
| 2007/0261538 | A1 | 11/2007 | Takai et al. |
| 2007/0266843 | A1 * | 11/2007 | Schneider ............ G10H 1/0033 84/612 |
| 2008/0018625 | A1 * | 1/2008 | Ijichi .................. H04H 60/56 345/204 |
| 2008/0072740 | A1 * | 3/2008 | Horii ................ G06F 17/30017 84/609 |
| 2008/0072741 | A1 | 3/2008 | Ellis |
| 2008/0096726 | A1 * | 4/2008 | Riley ................. A63B 24/0006 482/8 |
| 2008/0147711 | A1 | 6/2008 | Spiegelman et al. |
| 2008/0153671 | A1 | 6/2008 | Ogg et al. |
| 2009/0025539 | A1 | 1/2009 | Sagoo et al. |
| 2009/0044687 | A1 * | 2/2009 | Sorber ............... A63B 71/0622 84/609 |
| 2009/0217804 | A1 | 9/2009 | Lu et al. |
| 2010/0145892 | A1 | 6/2010 | Yang et al. |
| 2010/0168879 | A1 | 7/2010 | Takatsuka et al. |
| 2011/0015765 | A1 | 1/2011 | Haughay, Jr. et al. |
| 2011/0093100 | A1 * | 4/2011 | Ramsay ............... G06F 3/011 700/94 |
| 2012/0254907 | A1 | 10/2012 | Serdiuk |
| 2012/0331386 | A1 * | 12/2012 | Hicken ............. G06F 16/90324 715/716 |
| 2013/0091167 | A1 | 4/2013 | Bertin-Mahieux et al. |
| 2013/0191088 | A1 | 7/2013 | Wells et al. |
| 2013/0228063 | A1 | 9/2013 | Turner |
| 2013/0339343 | A1 | 12/2013 | Hierons et al. |
| 2014/0270375 | A1 | 9/2014 | Canavan et al. |
| 2014/0277648 | A1 | 9/2014 | Chong et al. |
| 2014/0307878 | A1 | 10/2014 | Osborne et al. |
| 2015/0032675 | A1 | 1/2015 | Huehn et al. |
| 2015/0081066 | A1 | 3/2015 | Yeh et al. |
| 2015/0142147 | A1 * | 5/2015 | Stanghed .......... G06F 17/30743 700/94 |
| 2016/0004744 | A1 | 1/2016 | Eriksson |
| 2016/0055420 | A1 | 2/2016 | Karanam et al. |
| 2016/0092559 | A1 | 3/2016 | Lind et al. |
| 2016/0292270 | A1 * | 10/2016 | Negi ................... G06F 3/165 |
| 2016/0346604 | A1 * | 12/2016 | Lindstrom ............. G06F 16/68 |
| 2017/0193097 | A1 | 7/2017 | Cramer et al. |
| 2017/0195700 | A1 * | 7/2017 | Jin ................. H04N 21/234381 |
| 2017/0337033 | A1 * | 11/2017 | Duyan ............... A63B 24/0062 |

FOREIGN PATENT DOCUMENTS

| | | |
|---|---|---|
| WO | 2006/072961 A2 | 7/2006 |
| WO | 2014/096832 A1 | 6/2014 |

OTHER PUBLICATIONS

Summons to Attend Oral Proceedings from the European Patent Office for European Application No. 16169963.2, mailed Oct. 31, 2017, 10 pages.
Innternational Search Report and Written Opinion from International Patent Application No. PCT/US2017/036575, dated Jul. 17, 2017.
U.S. Appl. No. 14/883,336 as filed on Oct. 14, 2015 for "Selection and Playback of Song Versions Using Cadence".
U.S. Appl. No. 14/883,252 as filed on Oct. 14, 2015 for "Repetitive Motion Activity Enhancement Based Upon Media Content Selection".
U.S. Appl. No. 14/883,245 as filed on Oct. 14, 2015 for "Heart Rate Control Based Upon Media Content Selection".
U.S. Appl. No. 14/883,232 as filed on Oct. 14, 2015 for "Cadence Determination and Media Content Selection".
U.S. Appl. No. 14/883,298 as filed on Oct. 14, 2015 for "Cadence-Based Playlists Management System".
U.S. Appl. No. 14/883,273 as filed on Oct. 14, 2015 for "Multi-Track Playback of Media Content During Repetitive Motion Activities".
U.S. Appl. No. 14/883,295 as filed on Oct. 14, 2015 for "Search Media Content Based Upon Tempo".
U.S. Appl. No. 14/883,318 as filed on Oct. 14, 2015 for "Cadence and Media Content Phase Alignment".
U.S. Appl. No. 14/944,972 as filed on Nov. 18, 2015 for "System for Managing Transitions Between Media Content Items".
U.S. Appl. No. 14/883,340 as filed on Oct. 14, 2015 for "Cadence-Based Selection, Playback, and Transition Between Song Versions".
U.S. Appl. No. 14/883,323 as filed on Oct. 14, 2015 for "Accessibility Management System for Media Content Items".
The Echonest, "Analyzer Documentation", Version 3.2, Jan. 7, 2014, 7 pages.
Extended European Search Report for European Patent Application No. 16169963.2, dated Oct. 21, 2016, 9 pages.
U.S. Appl. No. 14/945,008 as filed on Nov. 18, 2015 for "Identifying Media Content".
International Search Report and Written Opinion from International Patent Application No. PCT/US2017/036571, dated Aug. 4, 2017.

* cited by examiner

SEARCH MEDIA CONTENT BASED UPON TEMPO

CROSS-REFERENCE TO RELATED APPLICATION

This application claims priority to U.S. Ser. No. 62/347,651, filed on Jun. 9, 2016, entitled SEARCH MEDIA CONTENT BASED UPON TEMPO, the disclosure of which is hereby incorporated by reference in its entirety.

BACKGROUND

Running, as well as many other recreation or fitness activities, include repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to a system for searching for media content of a desired tempo. Various aspects are described in this disclosure, which include, but are not limited to, the following aspects.

In one aspect a media system includes: a media-playback device including: a media-output device that plays media content items; and a tempo control engine configured to: select media content based upon suitability for a repetitive-motion activity; place each media content item from the media content into two or more pools of media content, with a first pool including media content which the user has previously indicated as being relevant, and a second pool including media content that the user has not previously indicated as being relevant; and sort the media content in each of the first pool and the second pool based upon tempo.

In another aspect, a media system includes: a media-playback device including a media-output device that plays media content items, and a tempo control engine configured to receive a selection of a desired tempo; and a server configured to: select media content based upon suitability for a repetitive-motion activity; place each media content item from the media content into two or more pools of media content, with a first pool including media content which the user has previously indicated as being relevant, and a second pool including media content that the user has not previously indicated as being relevant; and sort the media content in each of the first pool and the second pool based upon tempo.

In yet another aspect, a method for selecting media content based upon tempo includes: selecting media content based upon suitability for a repetitive-motion activity; placing each media content item from the media content into two or more pools of media content, with a first pool including media content which the user has previously indicated as being relevant, and a second pool including media content that the user has not previously indicated as being relevant; and sorting the media content in each of the first pool and the second pool based upon tempo.

DETAILED DESCRIPTION

Figure 1:
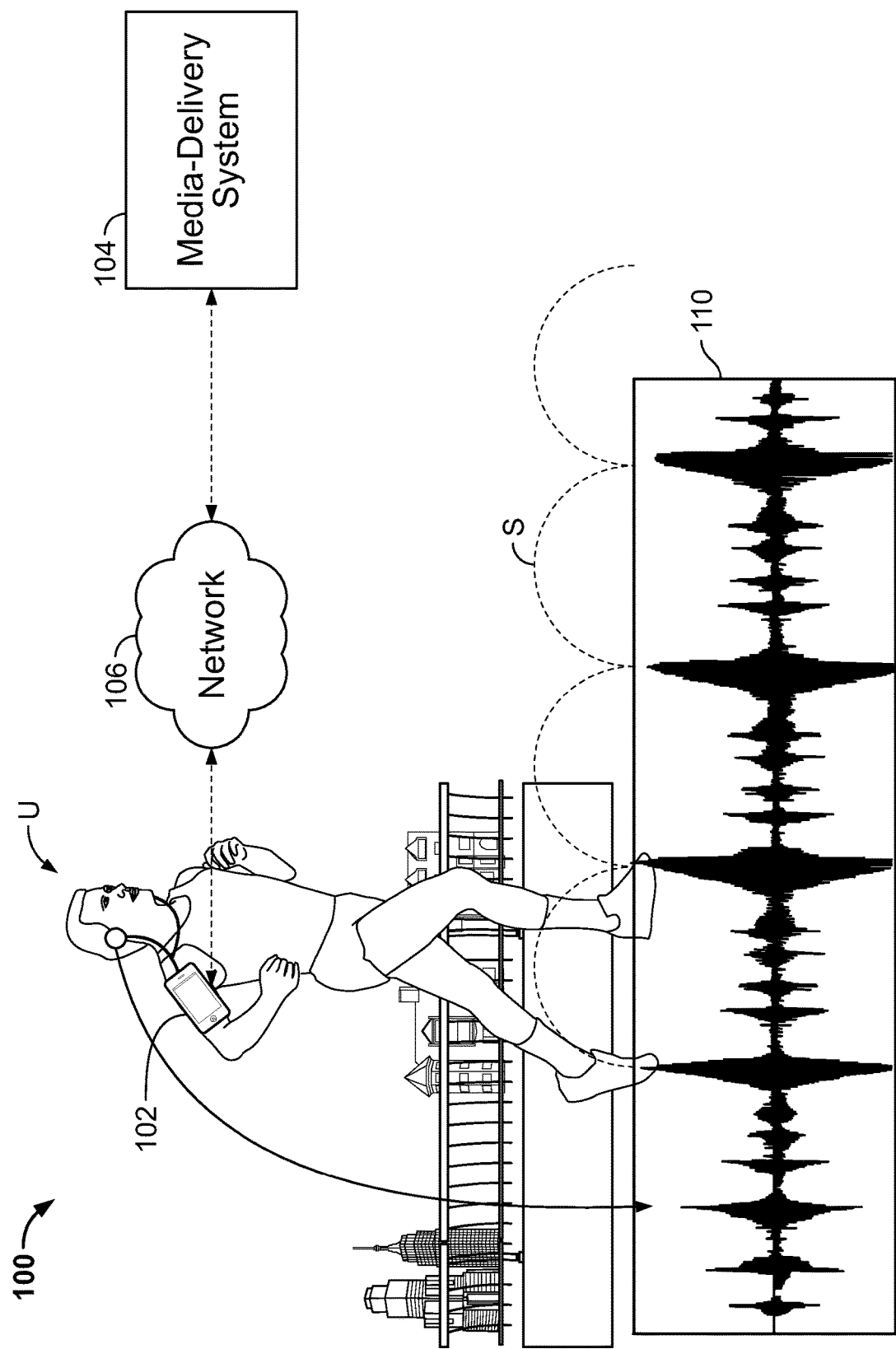
FIG. 1 illustrates an example system for tempo searching and media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive-motion activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

FIG. 1 illustrates an example system 100 for cadence determination and media content selection. The example system 100 includes a media-playback device 102 and a media-delivery system 104. The system 100 communicates across a network 106. Also shown, is a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal to or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal to or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM.

Further, in some embodiments, the media-playback device 102 operates to play music having a tempo equal to or approximately equal to a user U's cadence after it is rounded. For example, the cadence may be rounded to the nearest multiple of 2.5, 5, or 10 and then the media-playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

Figure 2:
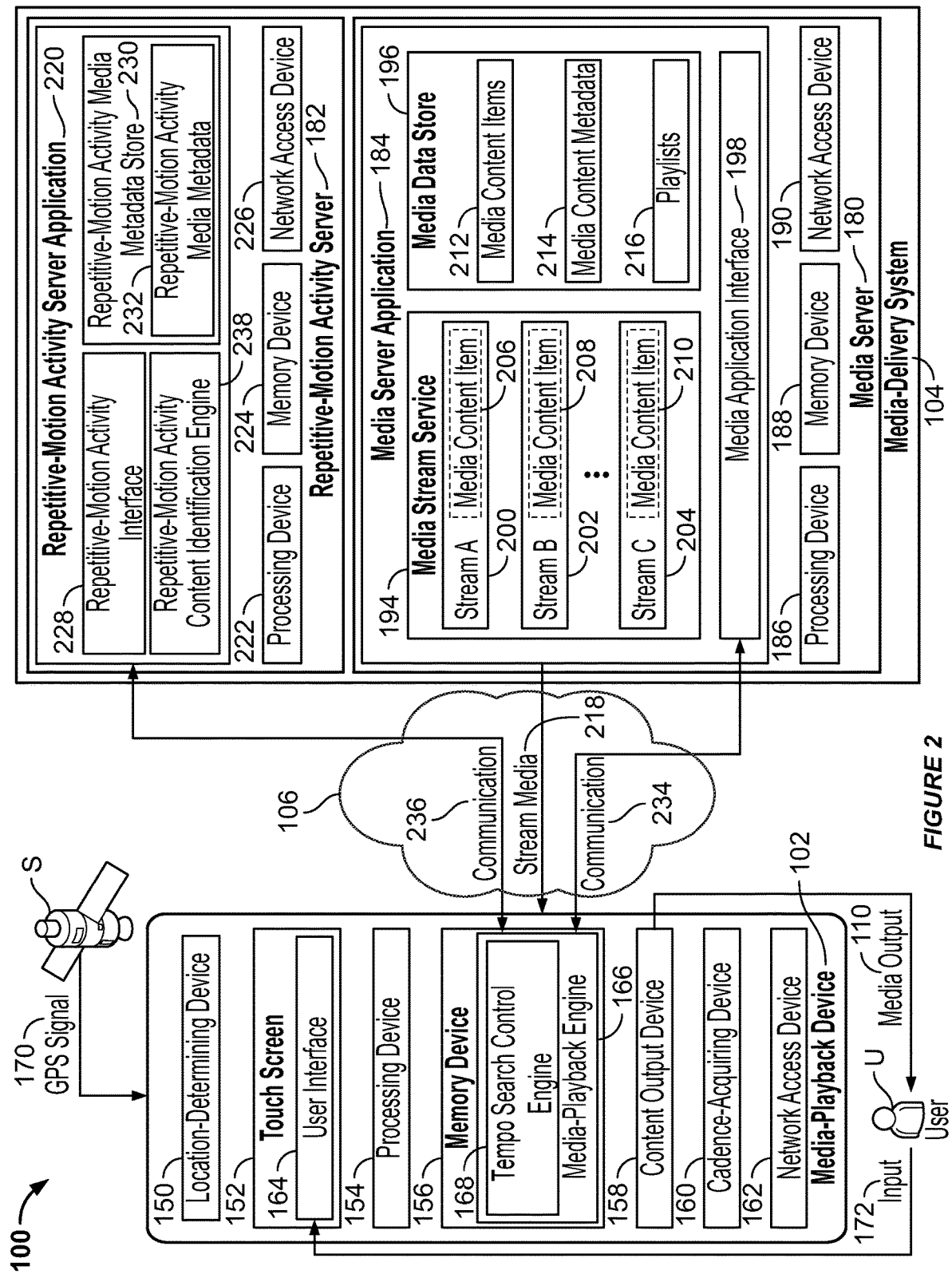
FIG. 2 is a schematic illustration of the example system of FIG. 1.

FIG. 2 is a schematic illustration of an example system 100 for cadence determination and media content selection. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, WI-FI® positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a tempo search control engine 168. In some embodiments, the media-playback engine 166 operates to playback media content and the tempo search control engine 168 operates to select media content for playback based on various conditions, such as tempo. Additional details regarding the tempo search control engine 168 are provided below.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a BLUETOOTH® transmitter, a display panel, and a video output jack. Other embodiments are possible as well. For example, the content output device 158 may transmit a signal through the audio output jack or BLUETOOTH® transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH®, ultra-wideband (UWB), 802.11, ZIGBEE®, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that correspond to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for cadence determination and media content selection, other embodiments are possible as well. For example, in some embodiments, the media-playback device 102 includes a media data store 196 and the media-playback device 102 is configured to perform cadence determination and media content selection without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
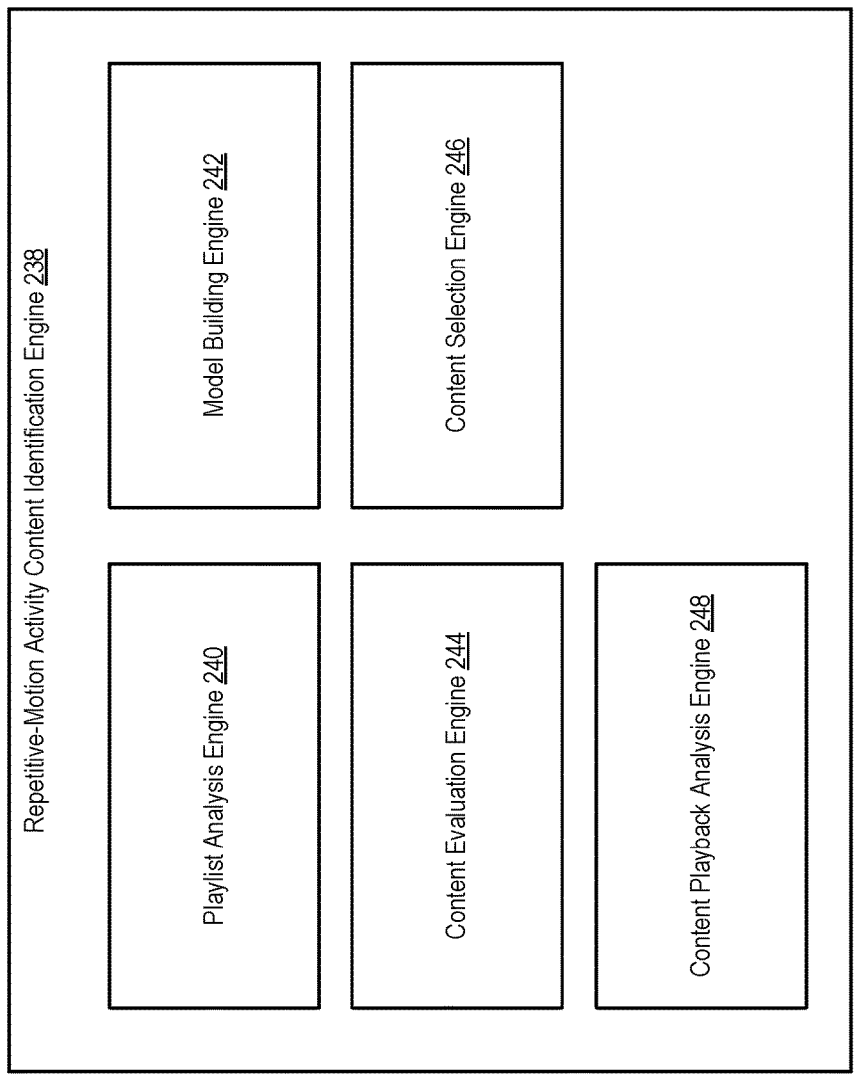
FIG. 3 is a schematic block diagram of the repetitive-motion activity content identification engine of FIG. 2.

FIG. 3 is a schematic block diagram of the repetitive-motion activity content identification engine 238. In some embodiments, the repetitive-motion activity content identification engine 238 includes a playlist analysis engine 240, a model building engine 242, a content evaluation engine 244, a content selection engine 246, and a content playback analysis engine 248.

The playlist analysis engine 240 operates to analyze playlists to identify media content items that users have identified as being suitable for playback during repetitive-motion activities (e.g., media content items that are runnable). Example methods performed by some embodiments of the playlist analysis engine 240 are illustrated and described with respect to at least FIG. 5.

The model building engine 242 operates to build one or more models that can be used to identify media content items for playback during one or more types of repetitive-motion activities. In various embodiments, the model building engine 242 uses one or more machine learning techniques to build the models. Example methods performed by some embodiments of the model building engine 242 are illustrated and described with respect to at least FIG. 6.

The content evaluation engine 244 operates to evaluate media content items to determine whether the media content items may be suitable for playback during one or more types of repetitive-motion activity. In some embodiments, a media content item is suitable for playback during a repetitive-motion activity if it is likely that the playback of the media content item is likely to enhance a user's performance or enjoyment of the repetitive-motion activity. As another example, a media content item that is conducive to the repetitive-motion activity is suitable for playback during the repetitive-motion activity. In some embodiments, the content evaluation engine 244 uses models generated by the model building engine 242. Additionally, in some embodiments, the content evaluation engine 244 generates scores for media content items based on the suitability of the media content items for playback during one or more repetitive-motion activities. Example methods performed by some embodiments of the content evaluation engine 244 are illustrated and described with respect to at least FIGS. 7-8.

The content selection engine 246 operates to select media content items for playback during a repetitive-motion activity. In at least some embodiments, the content selection engine 246 filters media content items based on one or more characteristics including but not limited to a score generated by the content evaluation engine 244. Additional details of some embodiments of the content selection engine 246 are illustrated and described with respect to at least FIGS. 10-17.

The content playback analysis engine 248 operates to analyze the playback (or use) of media content items by users. In some embodiments, the content playback analysis engine 248 identifies media content items that are frequently played back or skipped during repetitive-motion activities. Additionally, in some embodiments, the content playback analysis engine 248 uses one or metrics related to the repetitive-motion activity such as performance metrics, physiological metrics, and enhancement metrics. Examples of performance metrics include speed and cadence. Example physiological metrics include physiological measurements such as heart rate. Examples of enhancement metrics include cadence alignment to the media content. Other metrics that are analyzed by some embodiments include whether a user indicated liking a media content item (e.g., by actuating a like control during playback or at a later time such as during a playlist review after completion of the repetitive-motion activity), whether the user added the media content item to a playlist, etc. Example methods performed by some embodiments of the content selection engine 246 are illustrated and described with respect to at least FIG. 9.

Figure 4:
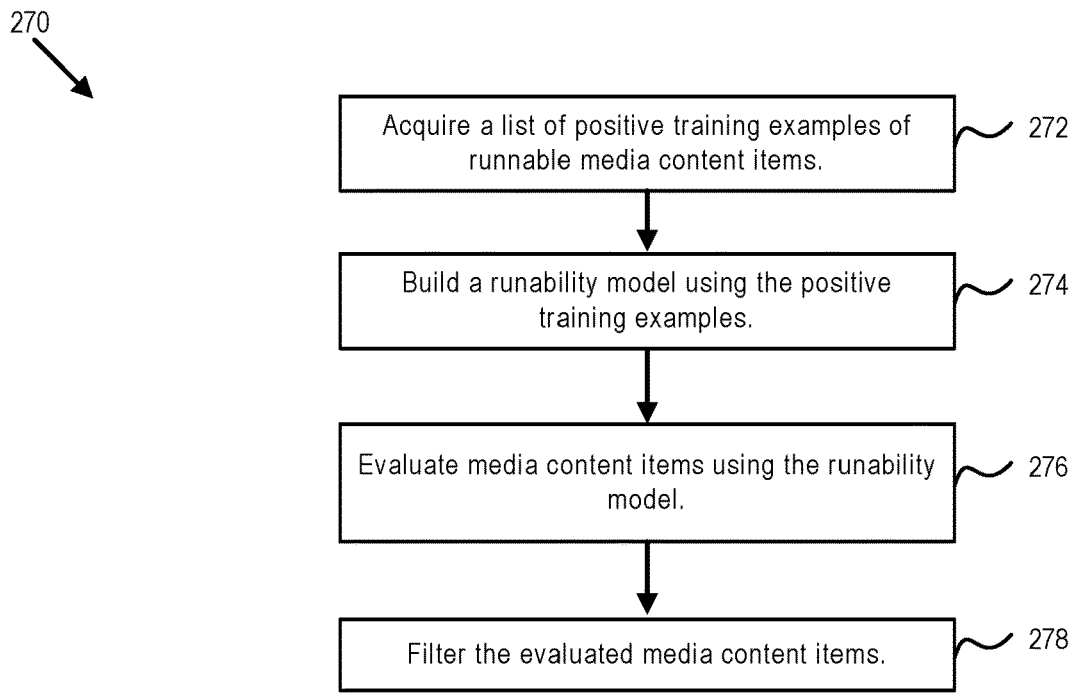
FIG. 4 illustrates an example method of identifying media content for playback during a repetitive-motion activity performed by some embodiments of the repetitive-motion activity content identification engine of FIG. 2.

FIG. 4 illustrates an example method 270 of identifying media content for playback during a repetitive-motion activity performed by some embodiments of the repetitive-motion activity content identification engine 238. Such a method can be used, for example, when the user is engaged in repetitive-motion activities, such as running, biking, or walking. Media content, such as music, can impact the performance or enjoyment of such activities. For example, as noted above, music of a faster tempo can encourage the user U to run at a faster cadence.

At operation 272, a list of positive training examples of runnable media content items is acquired. In some embodiments, the list is generated by analyzing playlists of one or more users to identify media content items that have been added to a running related playlist. In other embodiments, a user may identify one or media content items he or she enjoys running to.

At operation 274, a runnability model is built using the positive training examples. In various embodiments, the runnability model is built using one or more machine learning techniques. Further, in some embodiments, the model is built based on audio analysis of the media content items. Additionally, in some embodiments, the model is built based on metadata associated with the media content items. A runnability model is an example of a repetitive-motion model.

At operation 276, media content items are evaluated using the runnability model generated in operation 274. In some embodiments, some or all of the media content items stored in the media data store 196 are evaluated. Some embodiments evaluate a subset of the media content items based on a characteristic such as a genre, era, popularity, tempo, etc. In some embodiments, a runnability score is generated for at least some of the evaluated media content items. In some embodiments, the runnability score is a value that corresponds to how similar a media content item is to the positive training examples as calculated using the runnability model. In some embodiments, the runnability score is a numerical value in the range of 0-1 in which higher values indicate the media content item is more similar to the positive training examples than a lower value. Some embodiments store the runnability scores in the repetitive-motion activity media metadata 232.

At operation 278, the evaluated media content items are filtered. The media content items may be filtered based on a variety of characteristics, including a runnability score threshold, a genre, and a tempo range. Additionally, some embodiments operate to filter media content items based on analysis of audio signals associated with the media content item. For example, media content items that include a variable tempo may be excluded. As another example, media content items having quiet or low-energy portions with a duration greater than a predetermined threshold are excluded. However, in some embodiments if the quiet or low-energy portion is near the beginning or end of the media content item, the media content item is not excluded. Instead, the quiet or low-energy portion may be excluded using mix-in or mix-out points. Examples of calculating and using mix-out and mix-in points are provided in U.S. Patent Application Ser. No. 62/163,865, filed on May 19, 2015, and U.S. patent application Ser. No. 14/944,972, filed on Nov. 18, 2015, both of which are titled SYSTEM FOR MANAGING TRANSITIONS BETWEEN MEDIA CONTENT ITEMS, the entireties of which are hereby incorporated by reference.

In some embodiments, the media content items that pass all of the filters are identified as runnable and a runnable flag (e.g., a Boolean value field) in the repetitive-motion activity metadata associated with the media content item. Alternatively, the runnability score of media content items that do not pass the filters may be adjusted (e.g., lowered or set to zero).

Although the method 270 has been described sequentially, in some embodiments the operations of method 270 are performed in different orders or include different operations. Additionally, in some embodiments, the operations of method 270 may be performed at different times or repeated independent of each other. For example, in some embodiments, operations 272 and 274 are repeated on a regular schedule (e.g., weekly, monthly, annually, etc.) to generate or update a list of runnable songs and the runnability model built from that list. While operations 276 and 278, on the other hand, are performed once initially on all media content items in the media data store 196 and is then repeated on new media content items as those new media content items are added to the media data store 196. Additionally, some embodiments do not perform operation 278.

Figure 5:
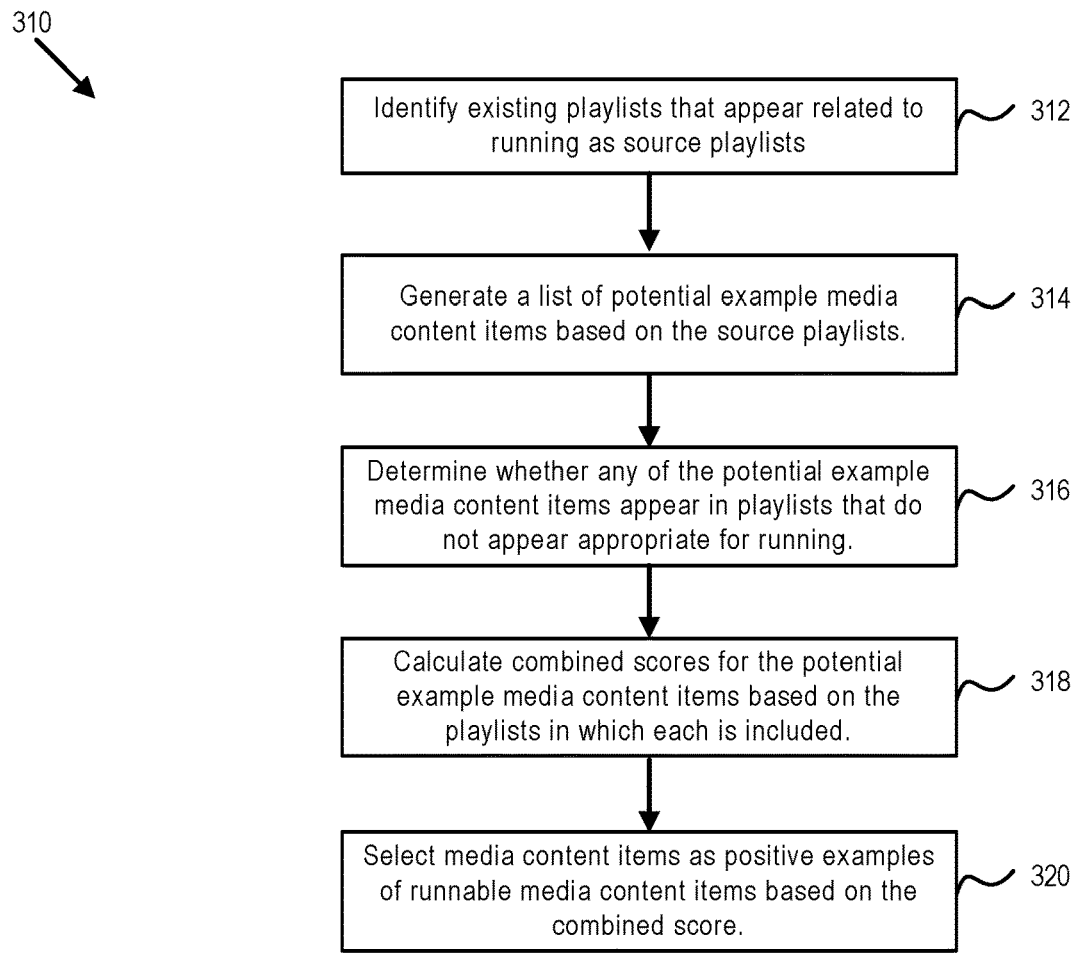
FIG. 5 illustrates an example method of acquiring a list of positive examples of runnable media content items that is performed by some embodiments of the playlist analysis engine of FIG. 2.

FIG. 5 illustrates an example method 310 of acquiring a list of positive examples of runnable media content items that is performed by some embodiments of the playlist analysis engine 240. Such a method can be used, for example, to identify media content items as runnable based on the playlists users have created.

At operation 312, playlists that appear related to running are identified as source playlists. The playlists may be identified by analyzing the playlists 216. In some embodiments, source playlists are identified based on the inclusion of certain words or phrases in a title or description associated with the playlist. For example, words that are related to running (e.g., run, running, jog, marathon, 5 k, etc.) may be used to identify source playlists. Additionally, in some embodiments, words that relate to fitness (work out, health club, training, etc.) are also used to identify source playlists. Furthermore, in some embodiments, words that relate to other types of repetitive-motion activities are also used to identify source playlists.

At operation 314, a list of potential example media content items is generated based on the source playlists. In some embodiments, all media content items appearing in at least a predetermined number of playlists are included in the list. In embodiments, the predetermined number is 1, 2, 5, 10, 50, 100, 500, or another number.

Further, some embodiments analyze the source playlists to further determine the relevance of the playlist to running. The analysis may be based on many factors including the words that were used to identify the source playlist, whether the words appeared in a title or a description, the curator of the playlist, the number of users that follow the playlist, the number of times the playlist has been played, etc. In some embodiments, a weighting scheme is used to calculate a weight value for the source playlists. Example weighting schemes used in some embodiment include: weighting a playlist that includes words associated with running higher than a playlist that includes words associated with fitness or another repetitive-motion activity; weighting a playlist that includes a relevant word in a title higher than a playlist that includes a relevant word in a description; weighting a playlist curated by a streaming service (or professional curator) higher than a playlist curated by a user (or vice versa); weighting a playlist with more followers higher than a playlist with fewer followers; weighting a playlist that has been played more times higher than a playlist that has been played fewer times. In some embodiments, the weighted values of the source playlists that include a particular potential example media content item are summed (or otherwise combined) and the resulting value (referred to as a positive playlist inclusion score herein) is compared to a predetermined threshold. The potential example media content items with a positive playlist inclusion score that exceeds the threshold may be analyzed further as described below.

At operation 316, it is determined whether the potential example media content items are included in playlists that appear inappropriate for running. In some embodiments, playlists are identified as inappropriate for running based on the inclusion of words or phrases in a title that are related to relaxing (e.g., calming, chill, relax, wind down, sleep, calm, etc.). In some embodiments, a negative playlist inclusion score is calculated for the potential example media content items based on being included in playlists that are identified as not being appropriate for running. The negative playlist inclusion score for a potential example media content item is calculated in a similar manner and according to similar factors as the positive playlist inclusion score.

At operation 318, a combined playlist inclusion score is calculated for the potential example media content items included in the list based on the playlists in which the potential example media content items are included. In some embodiments, the combined playlist inclusion score is calculated as a ratio of the positive playlist inclusion score to the negative playlist inclusion score. In other embodiments, the combined playlist inclusion score is calculated otherwise, such as by calculating a difference between the positive playlist inclusion score and the negative playlist inclusion score. Further, in some embodiments, the combined playlist inclusion score is calculated as a difference between or ratio of the number of playlists that appear related to running and the number of playlists that appear inappropriate for running in which the media content item is included.

At operation 320, potential example media content items are selected as positive example media content items based upon the combined playlist inclusion score In some embodiments, potential example media content items that have a combined playlist inclusion score exceeding a predetermined threshold are selected as positive examples of runnable media content items. As an example, when the combined playlist inclusion score is calculated as a ratio, the predetermined threshold is two, three, four, five, or ten in some embodiments. Other embodiments use a predetermined threshold in a range of one to twenty-five. Additionally, in some embodiments, a predetermined number of media content items having the highest combined playlist inclusion scores are selected as positive examples.

Figure 6:
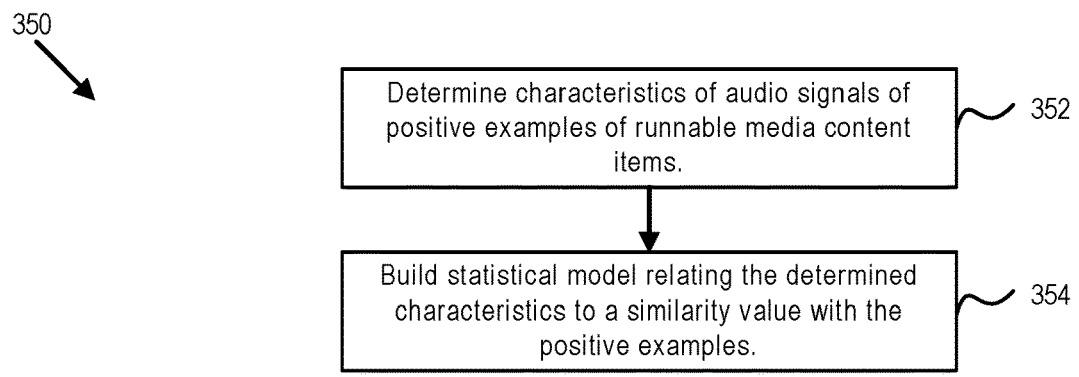
FIG. 6 illustrates an example method of building a runnability model based on positive examples of runnable media content items that is performed by some embodiments of the model building engine of FIG. 2.

FIG. 6 illustrates an example method 350 of building a runnability model based on positive examples of runnable media content items that is performed by some embodiments of the model building engine 242. Such a method can be used, for example, to build a model for classifying or identifying additional media content items as runnable.

At operation 352, characteristics of the audio signals of the positive examples of runnable media content items are determined. In some embodiments, the audio signals of the positive examples are analyzed to determine the characteristics. Additionally, in some embodiments, some or all of the characteristics of the audio signals are retrieved from the media content metadata 214 or elsewhere.

Example characteristics determined by some embodiments include an average duration of a musical event such as a single note or other musical event, a tempo regularity, a percussivity, and a beat strength. In some embodiments, the average duration of a musical event is calculated in various ways, including by dividing a total number of musical events in a media content item by a duration of the media content item. The tempo regularity corresponds to the consistency of the beat in a media content item. In some embodiments, the tempo regularity is based on calculating a standard deviation or variance value for measurements of the tempo over multiple intervals of a media content item. The percussivity corresponds to the strength or contribution of percussive instruments (or synthesized equivalents) to the media content item. The beat strength is proportional to the loudness of musical events that happen in correspondence to a beat. Some embodiments also include characteristics that are determined by other machine learning models. For example, some embodiments, include an energy characteristic that is calculated by a machine learning model trained to rate the relative energy levels of various media content items similarly to a user's rating of the energy level. Other embodiments determine additional, different, or fewer characteristics.

At operation 354, the determined characteristics are used to build a statistical model that relates the determined characteristics to a similarity value to the positive examples. In some embodiments, the model is a function or equation that operates on the values of the various characteristics to calculate a value corresponding to the similarity to the positive examples. In some embodiments, the model represents each characteristic as a dimension in a multi-dimensional space. Further, in some embodiments, the model defines an equation to compute the likelihood of a media content item being similar to the positive examples as far as the modeled characteristics are concerned.

In some embodiments, various machine learning techniques are used to generate the model. For example, in some embodiments, the model is generated using a variational Bayes Gaussian mixture model. In other embodiments, other machine learning techniques are used as well.

Figure 7:
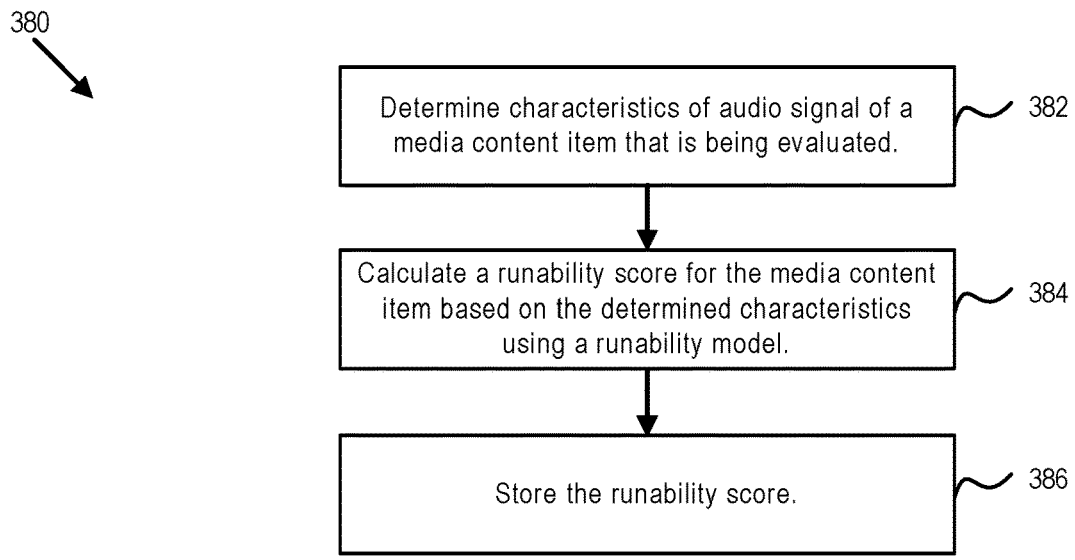
FIG. 7 illustrates an example method of evaluating media content items using a runnability model that is performed by some embodiments of the content evaluation engine of FIG. 2.

FIG. 7 illustrates an example method 380 of evaluating media content items using a runnability model that is performed by some embodiments of the content evaluation engine 244. Such a method can be used, for example, to calculate a runnability score for media content items.

At operation 382, characteristics of the audio signal of a media content item that is being evaluated are determined. The operation 382 is similar to the operation 352 except that the characteristics are determined for the media content item that is being evaluated rather than the positive examples.

At operation 384, a runnability score is calculated using the runnability model and the determined characteristics. As noted above, the runnability model operates to calculate a value that corresponds to the similarity between the characteristics of the media content item being classified and the characteristics of the positive examples used to generate the model. In some embodiments, the value calculated using the runnability model is scaled to a numeric value between 0-1. Alternatively, the runnability score may be a Boolean value representing whether the value calculated by the runnability model satisfies a predetermined threshold for identifying a media content item as being runnable.

At operation 386, the runnability score is stored. In some embodiments, the runnability score is stored in the repetitive-motion activity media metadata 232 or the media content metadata 214.

Figure 8:
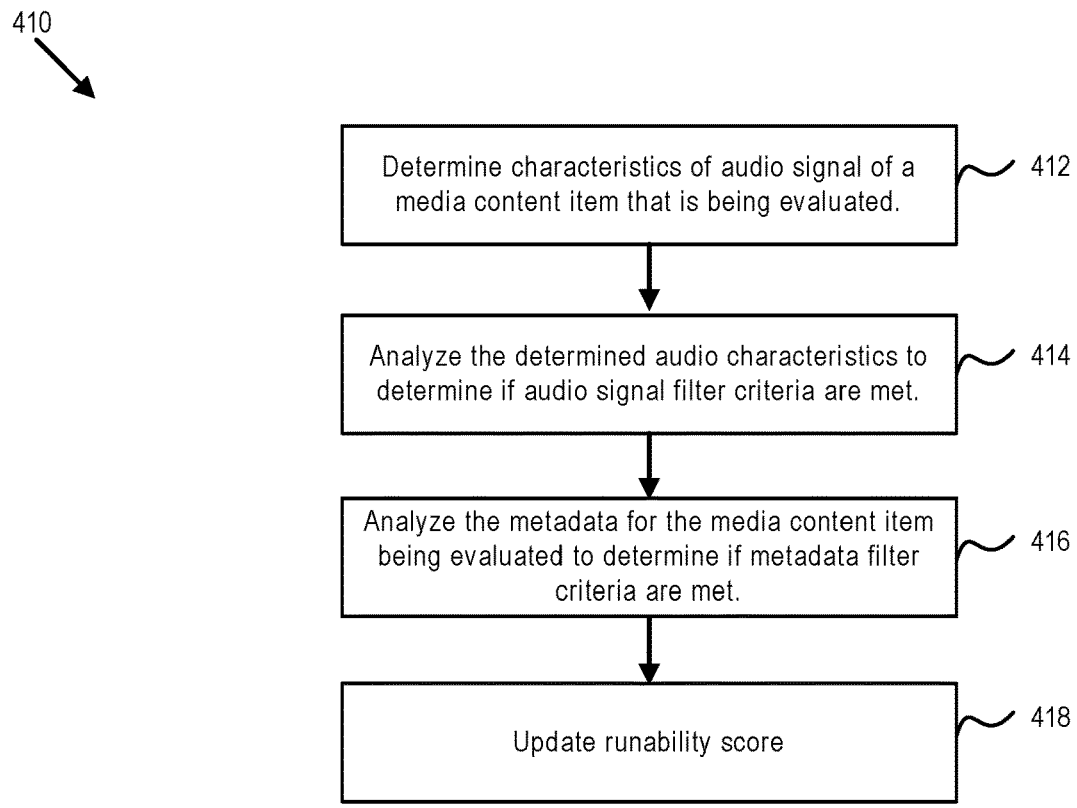
FIG. 8 illustrates an example method of filtering a media content item for runnability that is performed by some embodiments of the content evaluation engine of FIG. 2.

FIG. 8 illustrates an example method 410 of filtering a media content item for runnability that is performed by some embodiments of the content evaluation engine 244. Such a method can be used, for example, to exclude certain media content items that are unlikely to be suitable for playback during running.

At operation 412, characteristics of the audio signal of a media content item that is being evaluated are determined. The operation 412 is similar to the operations 352 and 382, however in some embodiments different or additional characteristics are determined. In some examples, a tempo regularity value is calculated as described above with respect to at least the operation 352 of FIG. 6. In addition, in some embodiments, a maximum duration of quietness and a maximum duration of lower energy are determined as well. In some embodiments, the maximum duration of quietness is based on a threshold volume level and operates to identify a maximum consecutive duration of the media content item that is below the threshold volume level. Similarly, the maximum duration of lower energy is based on a threshold volume level and operates to identify a maximum consecutive duration of the media content item that is below the threshold energy level. In some embodiments, the maximum duration of quietness and maximum duration of lower energy are calculated for a portion of the media content item identified by a mix-in point and mix-out point. Examples of calculating and using an energy level of a portion of a media content item are also provided in U.S. Patent Application Ser. No. 62/163,865 and Ser. No. 14/944,972, discussed above.

At operation 414, the determined audio characteristics are analyzed to determine if one or more audio signal criteria are met. The audio signal filters may operate to exclude media content items having audio signal characteristics that do not meet certain predetermined threshold values. Embodiments include one or more of the following example audio signal filters: a tempo regularity filter that operates to exclude media content items that do not meet a predetermined threshold for tempo regularity; a quiet gap filter that operates to exclude media content items that have a maximum duration of quietness that exceeds a predetermined threshold value; and a low-energy gap filter that operates to exclude media content items that have a maximum duration of low energy that exceeds a predetermined threshold value. Other embodiments include additional, different, or fewer audio signal filters.

At operation 416, the metadata for the media content item being evaluated is analyzed to determine if metadata filter criteria are met. In some embodiments, the metadata for the media content item being evaluated is retrieved from the media content metadata 214, the repetitive-motion activity media metadata 232, or elsewhere.

The metadata filters may operate to exclude media content items having metadata characteristics. Some embodiments include a genre filter that operates to exclude media content items of a particular genre (e.g., children's music or holiday music). Other embodiments include additional, different, or fewer metadata filters.

At operation 418, a stored runnability score associated with the media content item being evaluated is updated. For example, in some embodiments, if the media content item failed either the audio signal filters (operation 414) or the metadata filters (operation 416) then the runnability score is reduced or set to zero. Additionally, in some embodiments, a field is stored separately from the runnability score to categorically block (e.g., blacklist) media content items that fail to pass at least some of the filters discussed herein.

Figure 9:
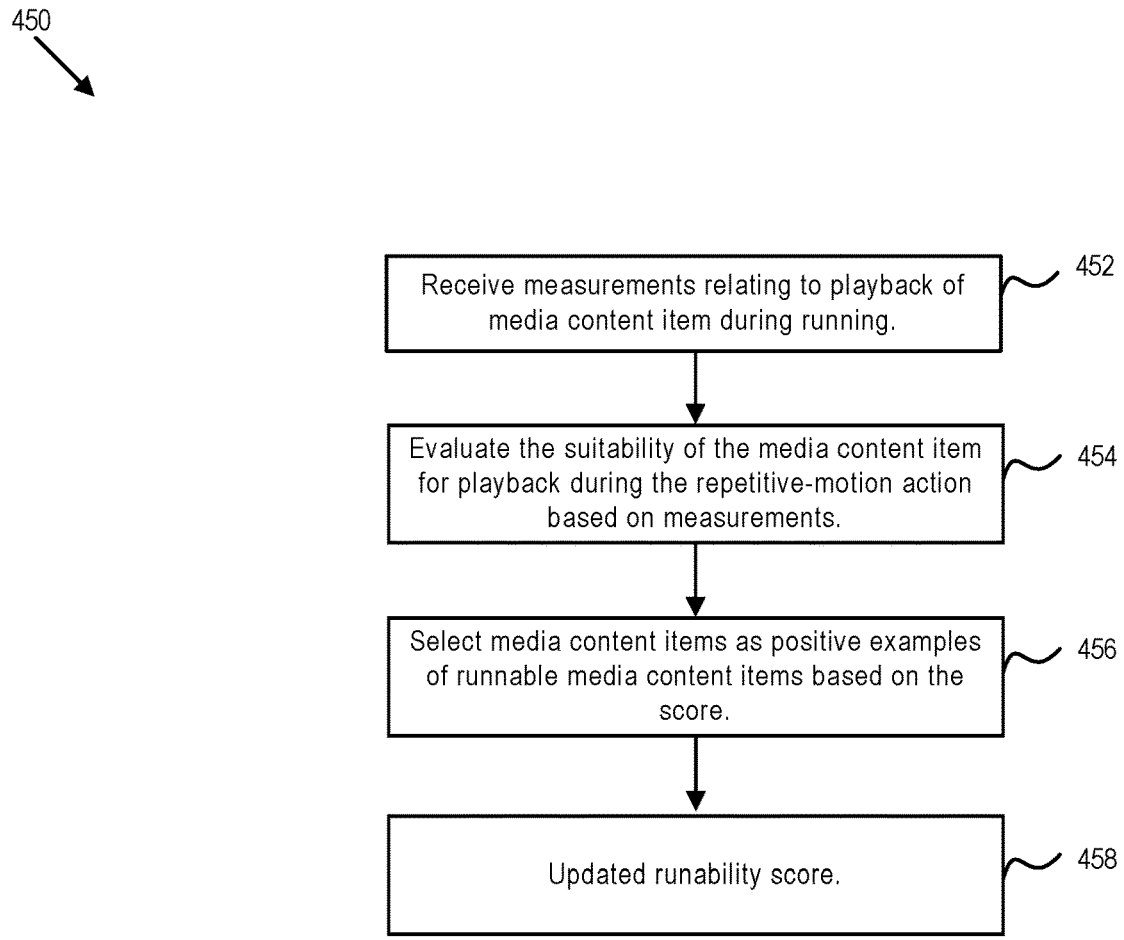
FIG. 9 illustrates an example method of analyzing the playback of media content items during running that is performed by some embodiments of the content playback analysis engine of FIG. 2.

FIG. 9 illustrates an example method 450 of analyzing the playback of media content items during running that is performed by some embodiments of the content playback analysis engine 248. Such a method can be used, for example, to identify media content items as runnable based on analyzing the playback of the media content items during running (or additionally or alternatively, in some embodiments, other repetitive-motion activities). The method 450 can be used to identify media content items that have positive effects on running. The method 450 can also be used to identify media content items that have negative effects on running. In some embodiments, the media content items having a positive effect are identified as positive examples for use in building or updating a runnability model as illustrated and described with respect to at least FIG. 6. Additionally, in some embodiments, the runnability scores of media content items that are identified as having a strong positive or negative effect are updated by the method 450.

At operation 452, measurements related to running while a particular media content item is being played back are received. In various embodiments, various measurements are received. In some embodiments, some or all of the measurements are captured by the media-playback device and transmitted to the media-delivery system 104. Example measurements include cadence, pace, cadence phase alignment to the media content item, and various physiological measurements. Examples of calculating cadence phase alignment to the media content item are provided in U.S. Patent Application Ser. No. 62/163,856, filed on May 19, 2015, and U.S. patent application Ser. No. 14/883,318, filed on Oct. 14, 2014, both of which are titled CADENCE AND MEDIA CONTENT PHASE ALIGNMENT, the entireties of which are hereby incorporated by reference. Examples of capturing and using physiological measurements are provided in U.S. Patent Application Ser. No. 62/163,915, filed on May 19, 2015, and U.S. patent application Ser. No. 14/883,245, filed on Oct. 14, 2015, both of which are titled HEART RATE CONTROL BASED UPON MEDIA CONTENT SELECTION, the entireties of which are hereby incorporated by reference. In some embodiments, pace is calculated from cadence with an estimated or calibrated stride length. Additionally, pace can be calculated using the location-determining device 150.

Furthermore, in some embodiments the received measurements relate to a single user. Additionally, in some embodiments, the received measurements relate to multiple users and are received from multiple media-playback devices. In some embodiment, the measurements are received and captured for a time period (e.g., a week, a month, two months, three months, six months, etc.).

At operation 454, the suitability of the media content items for playback during running is evaluated based on the received measurements. In some embodiments, a score is generated that corresponds to the suitability of a particular media content item for playback during running. In some embodiments, the suitability of a media content item is calculated based on comparing the captured measurements to a target value for the parameter being measured. For example, if the user has indicated a desire to run with a cadence of 180 steps per minute, media content items that were played back while measurements of cadence that are close to 180 steps per minute were captured may be considered to positively affect the repetitive-motion activity. In some embodiments, the media content items are compared to one another to determine which media content items have a greater positive effect on the repetitive-motion activity. Beneficially, this comparative evaluation can be helpful to differentiate the effect of the media content item from the user's underlying performance or ability. Additionally, in some embodiments, media content items are evaluated based in part on calculating a metric related to how much the measurements change during playback of the media content item (e.g., standard deviation or variance). Further, in some embodiments, the media content items are evaluated based on whether users indicate liking a media content item (e.g., by actuating a like or favorite control) or disliking the media content item (e.g., by actuating a dislike control or skipping the media content item) when it is played during running.

At operation 456, at least some of the media content items for which measurements were received are identified as positive examples of runnable media content items. In some embodiments, the media content items are compared to a predetermined threshold for a suitability score. Additionally, in some embodiments, a predetermined number of the highest scoring media content items are selected as positive examples. The newly selected positive examples may be included with other previously selected positive examples or may be used to replace the previously selected positive examples.

At operation 458, a runnability score for the media content items for which measurements were received is updated based on whether it was determined that the media content item has a positive or negative effect on running. For example, the runnability score for a particular media content item is increased if it is determined that the media content item has a positive effect on running. Conversely, the runnability score for a particular media content item is decreased if it is determined that the media content item has a negative effect on running.

FIGS. 10-17, which are discussed below, illustrate examples relating to selecting media content for playback. In some embodiments, some or all of the methods disclosed in FIGS. 10-17 are performed by the content selection engine 246. Alternatively or additionally, in some embodiments, some or all of the methods disclosed in FIGS. 10-17 are performed by the tempo search control engine 168 on the media-playback device 102. Further, in some embodiments, the content selection engine 246 and the tempo search control engine 168 together perform some or all of the methods disclosed with respect to FIGS. 10-17.

Figure 10:
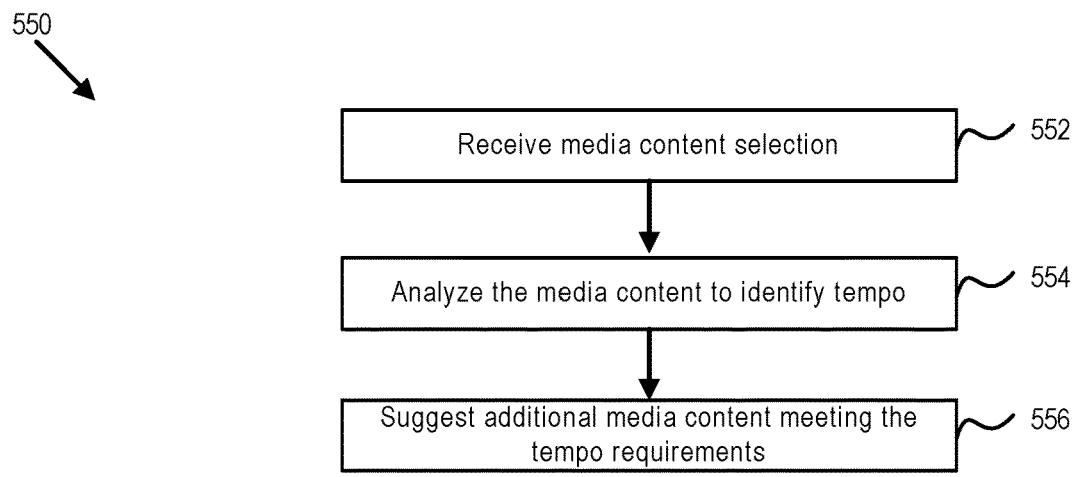
FIG. 10 illustrates an example method of selecting media content based upon tempo by some embodiments of the media-delivery system of FIG. 2.

FIG. 10 illustrates an example method 550 of selecting media content played by the media-playback device 102 based upon a tempo of the media content. Such a method can be used, for example, when the user is engaged in repetitive motion activities, such as running or walking. Media content, such as music, can impact the performance of such activities. For example, as noted above, music of a faster tempo can encourage the user U to run at a faster cadence and vice versa.

At the step 552 of the method 550, the tempo search control engine 168 of the media-playback device 102 receives a selection of media content. This selection can take a variety of forms.

Figure 14:
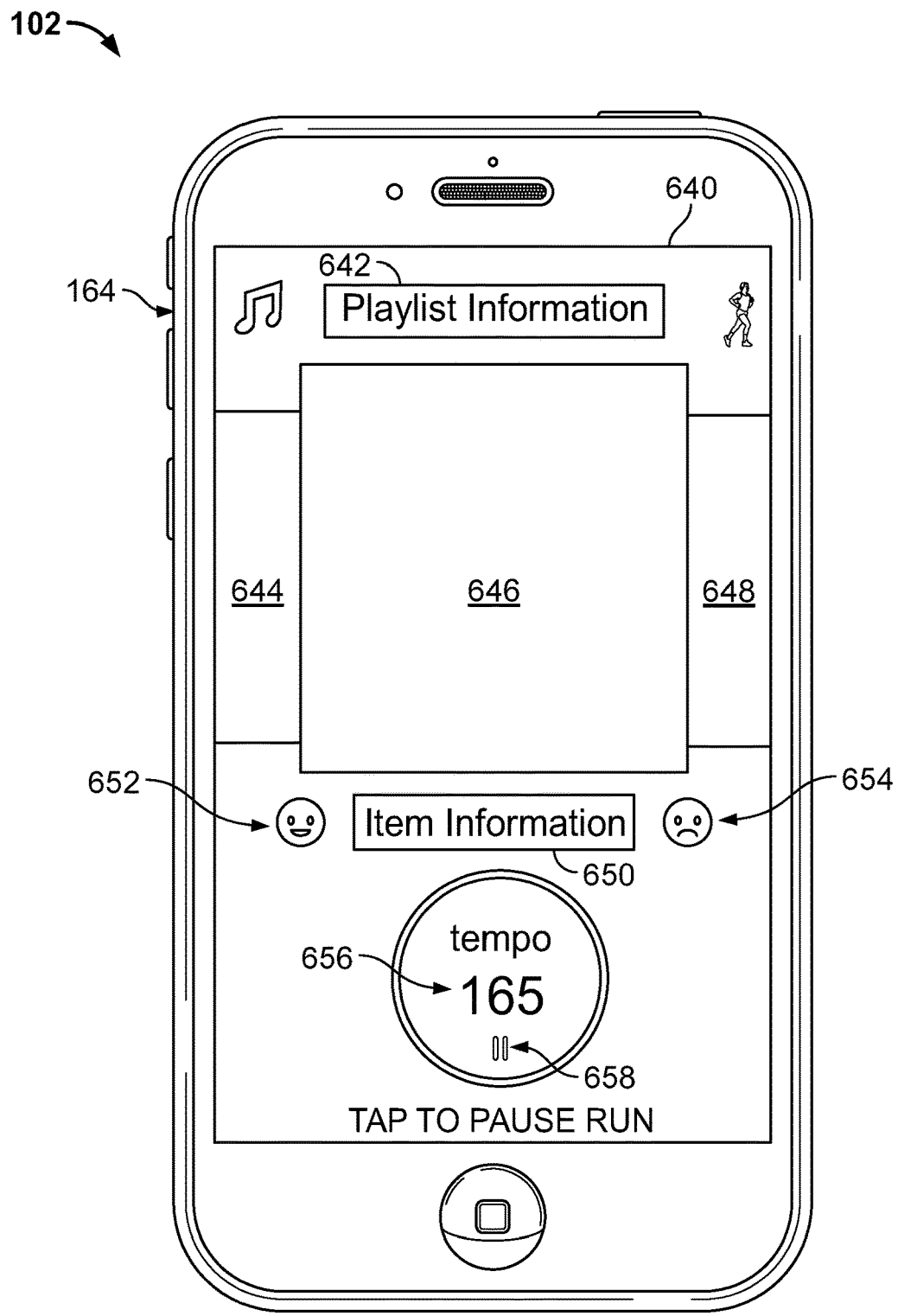
FIG. 14 shows an example tempo-based content playback screen displayed by some embodiments of the user interface of FIG. 2.

For example, the user U can simply identify certain media content of a desired tempo. In another example, the user can identify a desired tempo itself (e.g., 90 beats per minute), as shown in FIG. 14 and described further below.

In yet other examples, one or more automated processes can be used to select certain media content and/or a tempo. For example, various attributes of the user, such as the user's physiological state, can be used as an automated process for selecting a desired tempo. An example of such processes are described in U.S. Patent Application Ser. No. 62/163,915, filed on May 19, 2015, and U.S. patent application Ser. No. 14/883,245, filed on Oct. 14, 2015, both of which are titled HEART RATE CONTROL BASED UPON MEDIA CONTENT SELECTION, the entireties of which are hereby incorporated by reference. This patent application describes how physiological measurements, such as heart rate, and non-physiological measurements, such as location, can be used to automatically select a desired tempo for the user U.

Next, at step 554, the selected media content is analyzed to identify a relevant tempo. Various processes can be used to analyze media content, such as music, to determine a tempo. See FIG. 11 for more details.

Finally, at step 556, additional media content meeting the desired tempo requirements are provided to the user, such as in a graphical user interface. One example of such a user interface is described with reference to FIG. 14 below. Other examples are provided in U.S. Patent Application Ser. No. 62/163,887, filed on May 19, 2015, and U.S. patent application Ser. No. 14/883,273, filed on Oct. 14, 2015, both of which are titled MULTI-TRACK PLAYBACK OF MEDIA CONTENT DURING REPETITIVE MOTION ACTIVITIES, the entireties of which are hereby incorporated by reference. In that patent application, a grid interface for displaying media content options based on tempo is disclosed.

In one context, the steps 554, 556 are performed by the media-delivery system 104 in response to a request from the tempo search control engine 168. For example, the tempo search control engine 168 can receive an indication of a desired tempo (either through selected media content or a specified tempo), and the media-delivery system 104 is configured to perform the steps 554, 556 and deliver media content of the desired tempo back to the media-playback device 102 for consumption by the user U.

Figure 11:
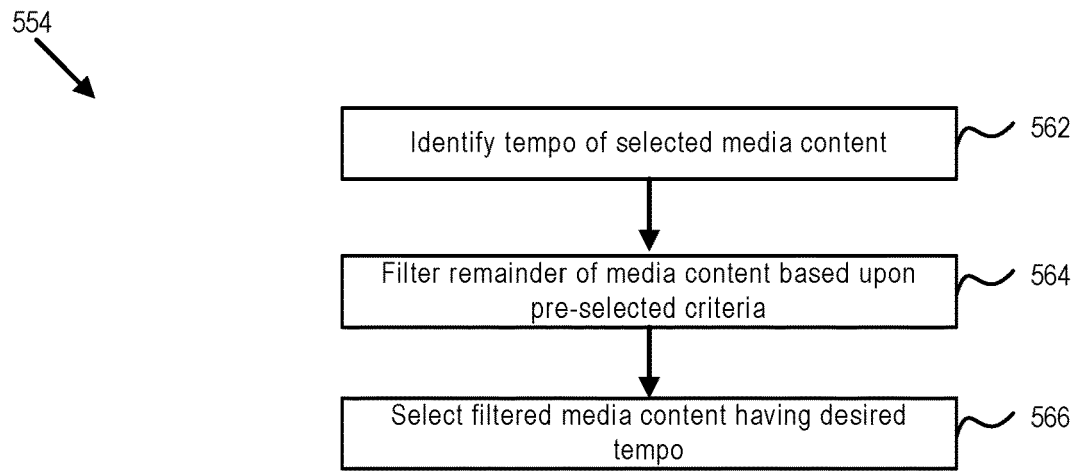
FIG. 11 illustrates an example method for analyzing the tempo of media content per the method shown in FIG. 10.

FIG. 11 illustrates a more detailed example of the step 554 of FIG. 10, in which media content is analyzed to identify tempo. As noted, the media-delivery system 104 can perform the step 554 based upon a request from the media-playback device 102.

At step 562, the relevant tempo is identified. In this context, the media content provided by the user U is analyzed to determine the tempo of the media content. This process is described below.

As noted, in other examples, the user can simply select a desired tempo instead of providing media content, or a tempo can automatically be provided based upon analysis of such criteria as physiological aspects of the user U, like heart rate.

Next, at step 564, the media content in the media server application 184 is filtered based upon certain criteria. In one example, each media content item stored by the media server application 184 is analyzed and particular additional metadata for each item is stored by the media content metadata 214.

This metadata may include such information as a tempo for the media content item. In one example, each media content item is analyzed, and a tempo is associated with the metadata for the item.

A tempo of a media content item can be determined in various known manners. In the example of songs, a tempo of a song can be relatively easily identified because songs typically have a steady tempo throughout their entire playing time. Where a tempo changes significantly throughout a song, in some embodiments, such variations in tempo can be averaged to represent a single tempo of the song. In other examples, a portion of the song having an approximately constant tempo can be identified, and such a constant tempo can be used as a tempo for the entire song. In yet other examples, the portion of the song having an approximately constant tempo is taken and used to replace the entire song while the other portion of the song, which has variable tempo, are excluded from playback. Other methods of obtaining a tempo of a song are also possible.

Additional details on determining a tempo for media content is provided in U.S. Patent Application Ser. No. 62/163,845, filed on May 19, 2015, and U.S. patent application Ser. No. 14/883,298, filed on Oct. 14, 2015, both of which are titled CADENCE-BASED PLAYLISTS MANAGEMENT SYSTEM, the entireties of which are hereby incorporated by reference.

The metadata may also include other criteria, such as a runnability score for each media content item. A runnability score can be calculated based upon a variety of methods and factors, such as comparison to other content known to have desired characteristics or properties that are suitable for running. Examples relating to calculating runnability scores are illustrated and described with respect to at least FIGS. 3-9. Additional details regarding how a runnability score can be calculated for a media content item are provided in U.S. Patent Application Ser. No. 62/163,921, filed on May 19, 2015, and U.S. patent application Ser. No. 14/934,008 filed on Nov. 18, 2015, both of which are titled IDENTIFYING MEDIA CONTENT, the entireties of which are hereby incorporated by reference.

Additional details on the filtering of the step 564 are provided in the example illustrated and described with reference to FIG. 12.

Finally, at step 566, filtered media content items having the desired tempo are selected. Additional details on this process are provided with reference to FIG. 13.

Figure 12:
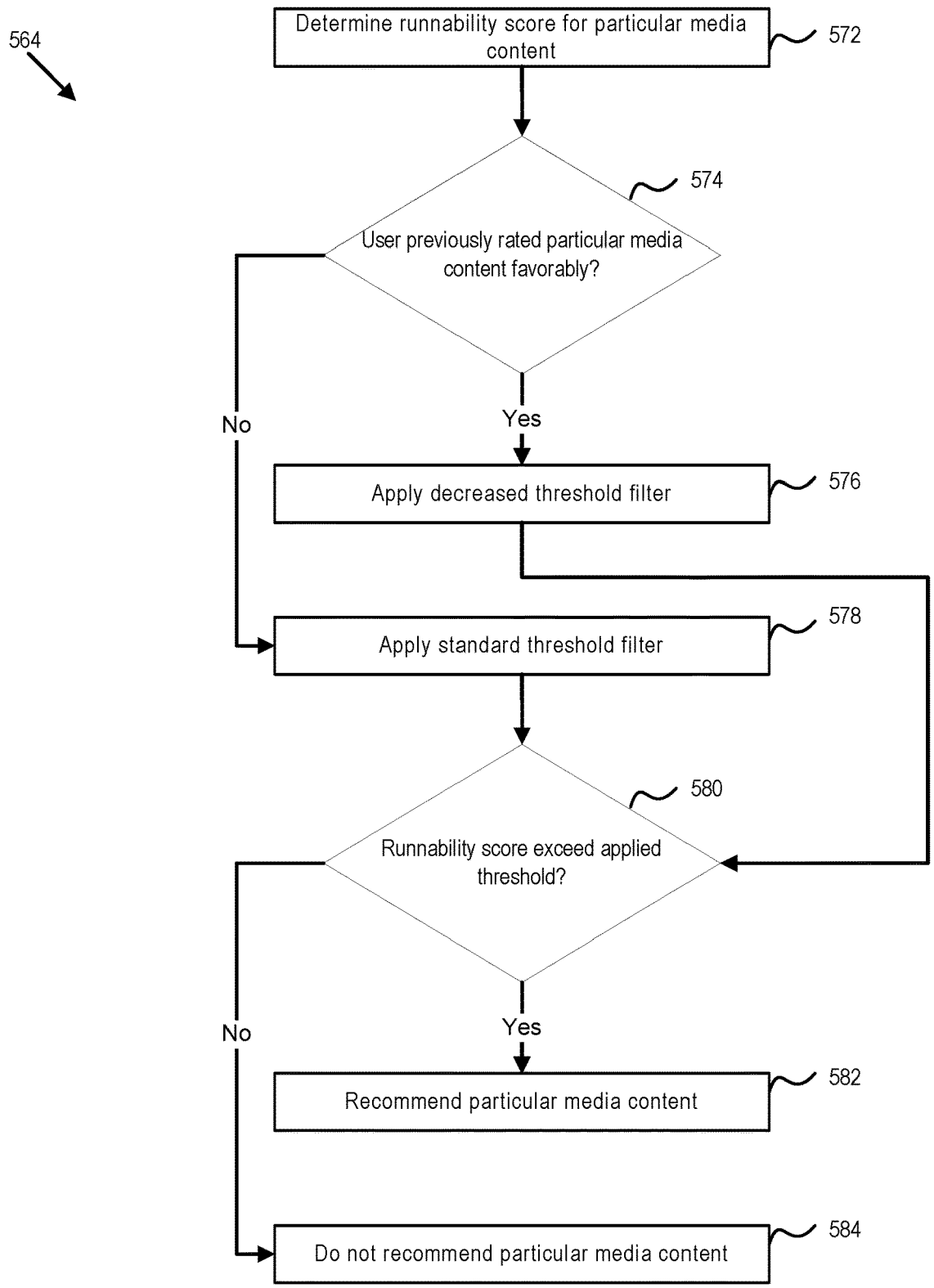
FIG. 12 illustrates an example method of filtering media content based upon criteria per the method shown in FIG. 11.

FIG. 12 illustrates a more detailed example of the step 564, shown in FIG. 11, involving the filtering of the media content.

At step 572, the runnability score for a particular media content item is determined. This can be accomplished using the processes described previously herein. Alternatively, the runnability score may be stored as part of the metadata associated with the media content item.

Next, at step 574, a determination is made regarding whether or not the user previously rated the particular media content item. For example, as described further below, the user U can rate a particular media content item as one the user likes or dislikes. If the user has previously liked the particular media content item, control is passed to step 576, and a decreased threshold filter is used. Otherwise, control is passed to step 578, and a standard filter threshold is used.

For example, if the user has previously "liked" the particular media content item, the decreased threshold filter may require that the runnability score for the media content item be at least 0.4. Alternatively, if the media content item has not been previously rated, the standard threshold filter may require that the runnability score for the media content item be at least 0.6. In this manner, media content items that were previously marked as "liked" are favored. Other threshold values can be used in other embodiments. A decreased threshold filter has a threshold value that is less than the threshold value of the standard filter threshold.

Next, at step 580, the relevant filter (i.e., decreased or standard threshold) is applied. If the media content item exceeds the threshold of the applied filter, control is passed to step 582, and the media content item is recommended to the user. Otherwise, control is passed to step 584, and the media content item is not recommended.

Figure 13:
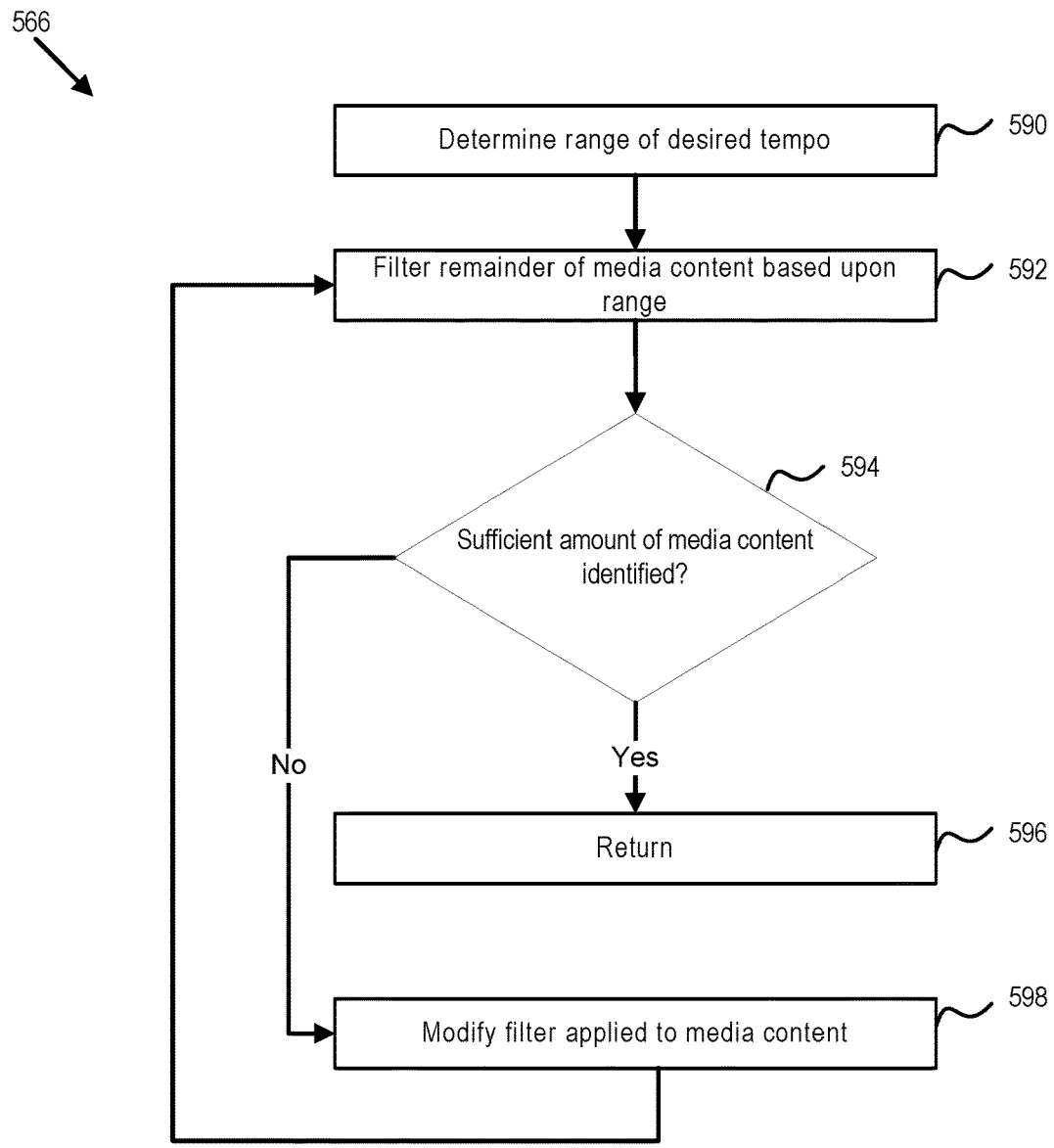
FIG. 13 illustrates another example method of filtering media content based upon criteria per the method shown in FIG. 12.

Referring now to FIG. 13, additional details are provided about the step 566 of filtering the media content based upon tempo.

At step 590, a desired tempo range is determined. This range is based upon the desired tempo that is either calculated from the media content selected by the user, the tempo that is specifically selected by the user, and/or by one or more automated processes of determining a desired tempo, such as by an analysis of heart rate, as described above.

The desired tempo is converted to a range of tempos, as is noted above. In some examples, this range can have various scales, such as 2 beats, 5 beats, 10 beats, etc. For example, if the desired tempo is 178, that tempo is converted to a range of 175-180.

In another example, the system is programmed to define a target number of songs to return, such as 5, 10, 15, 20, 50 100. For instance, if the target is to return 10 songs around 178 BPM, and given the number of songs available around that tempo, the resolution or range for the tempo can be modified, such as low as +/−0.5 BPM or a large as +/−7 BPM. The dynamic range is dependent on the size of the portfolio of media content, which can be driven by such factors as how the runnability scores are calculated. In other examples, the songs are simply ranks based upon how far each song is from the desired tempo, and the desired number of songs is selected based upon that ranking. In other instances, the range to find desired content is dynamically calculated based upon multiple factors, such as size of portfolio and runnability.

This range is then used at step 592 to filter the media content. Specifically, the tempo of each media content item is analyzed to determine if the tempo fails within the range. As noted above, each media content item may include metadata defining the tempo for that media content item. The tempo metadata can be used to determine if the media content item falls within the desired tempo range.

The media content falling within the desired range is then analyzed at step 594 to determine if sufficient media content has been identified. For example, if the range is a tempo of 175-180 beats per minute, perhaps 1000 songs fall within that range. In such an instance, a sufficient amount of media content has been identified, and control is provided to step 596, where the process continues.

However, if the number of media content items with the desired tempo is small, such as less than 100, less than 50, less than 20, less than 10, and/or less than 5, control can instead be passed to step 598, and the filtering of the content media can be modified.

One possible modification is to expand the range of tempos. In the example, the range could be expanded to be 170-185 in order to attempt to capture more media content items. In another example, other thresholds, such as the thresholds associated with the runnability scores used in the step 564 can be loosened. In yet another example, the tempo ranges can be halved or doubled (as noted above), which can result in tempos that provide similar guidance when running. Other configurations are possible.

Once the filters have been modified, control is passed back to the step 590 and the step 566 of filtering the media content based upon tempo is performed again with the modified filters.

Although filtering based upon criteria such as runnability and tempo are provided in the examples, other criteria can also be used to filter the media content. Examples of other criteria include the strength of the beat, the general energy of the content, the similarity of the content to other items. Other filtering based upon such criteria as desired genre, mood, or age (i.e., era) can also be used.

Referring now to FIG. 14, an example tempo-based content playback screen 640 displayed by some embodiments of the user interface 164 of the media-playback device 102 is shown. In some embodiments, the tempo-based content playback screen 640 is displayed in response to receiving a request by the user to select media content of a desired tempo.

In some embodiments, the tempo-based content playback screen 640 includes a playlist information message 642, a previous media content item display panel 644, a current media content item display panel 646, a next media content item display panel 648, a current media content item information message 650, a dislike control 652, a like control 654, a tempo information message 656, and a pause control 658.

The playlist information message 642 operates to display information about the currently playing playlist of media content items. The playlist may be a pre-defined playlist of media content items that correspond to an acquired cadence or an ad-hoc playlist generated by the media-playback device 102 or the media-delivery system 104 based on the acquired cadence. In some embodiments, the playlist information message 642 displays a title provided with a pre-defined playlist (e.g. "Outdoor Running," "Spin Class," "Peak Performance," etc.). In some embodiments, the playlist information message 642 displays information that relates to the media content items included in an ad-hoc playlist such as a region (e.g., Sweden, Europe, U.S., etc.), a genre (e.g., Country, Rock, Rap, etc.), a mood (e.g., calm, happy, etc.), an era (e.g., 70's, 80's, 90's, 00's, etc.), or popularity (e.g., Top 50, etc.).

The previous media content item display panel 644 operates to display information about the previously played media content item such as an image associated with the previously played media content item (e.g., an album cover, an artist photograph, etc.). The current media content item display panel 646 and the next media content item display panel 648 operate similarly with respect to the currently playing media content item and the media content item that is schedule to play next. In some embodiments, the user interface 164 operates to cause the next or previous media content item to begin playback in response to detecting a swipe input to the left or right over the current media content item display panel 646. Additionally, in some embodiments, the user interface 164 operates to cause the previously played media content item to begin playback in response to detecting a touch input on the previous media content item display panel 644. Similarly, in some embodiments, the user interface 164 operates to cause the next media content item to begin playback in response to detecting a touch input on the next media content item display panel 648.

The current media content item information message 650 operates to display information about the currently playing media content item. Some embodiments display one or more of the following: a title, an artist name, an album name, a current position, a total length, and a tempo.

The dislike control 652 and the like control 654 operate to receive inputs indicating that a user dislikes or likes the currently playing media content item. In some embodiments, the media-playback device stores a like/dislike value associated with the currently playing media content item upon actuation of either the dislike control 652 or the like control 654. The value may be stored locally on the media-playback device 102 or remotely on the media-delivery system 104 or elsewhere. In some embodiments, one or both of the media-playback device 102 and the media-delivery system 104 use the like/dislike values that have been previously stored in selecting media content items for future playback. Additionally, in at least some embodiments, upon actuation of the dislike control 652, the currently playing media content item stops playing immediately or after a period of time and a new media content item begins to play.

The tempo information message 656 operates to present information to the user about the tempo of the current media content item. In some embodiments, the tempo information message 656 displays a numeric value representing the user U's current tempo selection.

As noted, in some embodiments, the user can select a particular desired tempo manually. In such an example, the user can select the tempo information message 656 to bring up increase/decrease tempo arrows and/or a keypad that allows the user to directly input a desired tempo. Once the desired tempo is inputted by the user, the system can provide media content and/or samples at the desired tempo for the user.

Additionally, in some embodiments, the tempo information message 656 also presents information related to whether the tempo has recently changed. For example, the tempo information message 656 may include an arrow pointing up if the tempo has recently increased and an arrow pointing down if the tempo has recently decreased.

Alternatively, the tempo may be displayed in a first color to indicate a recent increase, a second color to indicate a recent decrease, and a third color to indicate a stable tempo. As yet another alternative, the tempo information message 656 may blink or otherwise indicate the occurrence of a recent change in tempo. In yet another embodiment, the tempo information message 656 may operate to indicate how a current tempo compares to a goal or target cadence using any of the previously mentioned visual indicators.

In yet other examples, information in addition to or other than tempo can be displayed. For example, the information message 656 can be configured to display the user U's heart rate. In yet another example, the information message 656 can be configured to display an estimated cadence, as described in U.S. Patent Application Ser. No. 62/163,840, filed on May 19, 2015, and U.S. patent application Ser. No. 14/883,232, both of which are titled CADENCE DETERMINATION AND MEDIA CONTENT SELECTION, the entireties of which are hereby incorporated by reference.

The pause control 658 operates to receive a pause input from the user. In some embodiments, the pause input triggers the media-playback device 102 to pause cadence acquisition. Beneficially, by pausing cadence acquisition, the user can take a break or otherwise change cadence without causing the playback of media content items to change. Users may take break for many reasons, such as to rest/recover, to wait to safely cross an intersection, or to wait for a running partner. Users may temporarily change cadence for many reasons as well such as to climb a stair case or a big hill, to cross rugged terrain, to weave through heavy traffic, etc. Additionally, in some embodiments, the pause input also triggers the media-playback device 102 to pause playback of the media content items.

Figure 15:
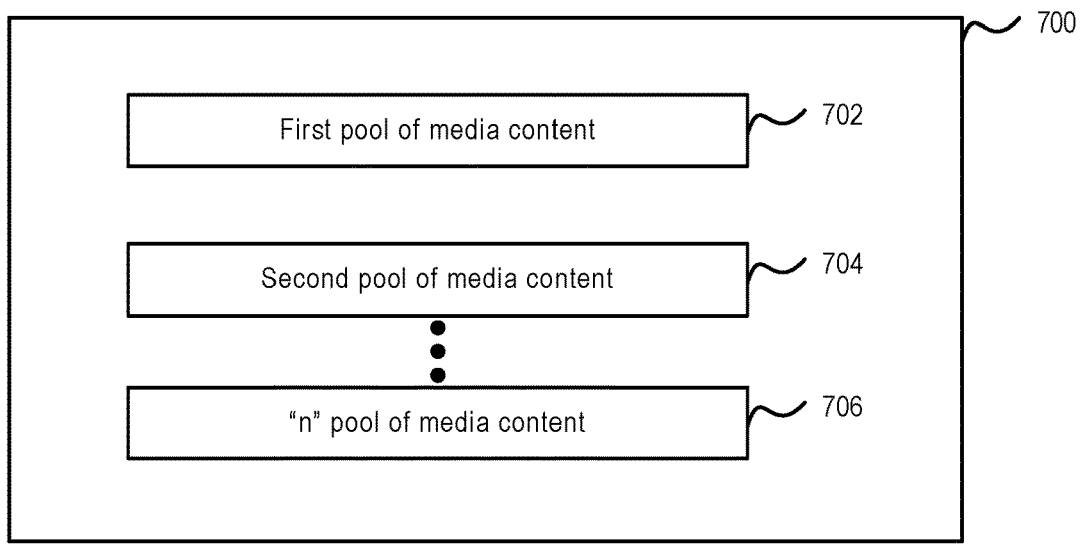
FIG. 15 shows a schematic illustration of an example corpus of media content.

Referring now to FIG. 15, the media content for a user can be selected in various ways. As illustrated, a corpus or universe 700 of media content can be sorted into pools that are thereupon used to fill buckets of particular tempos.

The universe 700 can be formed in various ways. In some examples, media content of various genres are eliminated. For example, tracks from some genres, such as Christmas music, children's music, etc., are removed from the universe 700. In another example, some genre-specific attributes can be used. For example, for tracks from a genre like jazz music, the suitability of a particular song (e.g., its runnability score) may be set higher than the suitability of a song from another genre, such as heavy metal music. In yet another example, media content having a runnability score less than a threshold is excluded. Other examples exist.

In the example of FIG. 15, a first pool 702 includes media content of a first variety. This media content can be selected based upon various attributes, such as whether or not the user has previously viewed/listened to the media content, liked the media content, etc. Media content can also be sorted into second and third pools 704, 706 that have different attributes, such as media content that is related to media content that the user has previously viewed/listened to, and media content that has no known relationship with media content the user has previously viewed/listened to. In such an example, the pool 702 would have media content that is likely to be most relevant to the user. Next, the pool 704 has media content that may be relevant based upon its relationship to the media content in the pool 702. And, the pool 706 has no specified relationship to the media content in the pool 702 and therefore may have the least likelihood to be relevant to the user.

Figure 16:
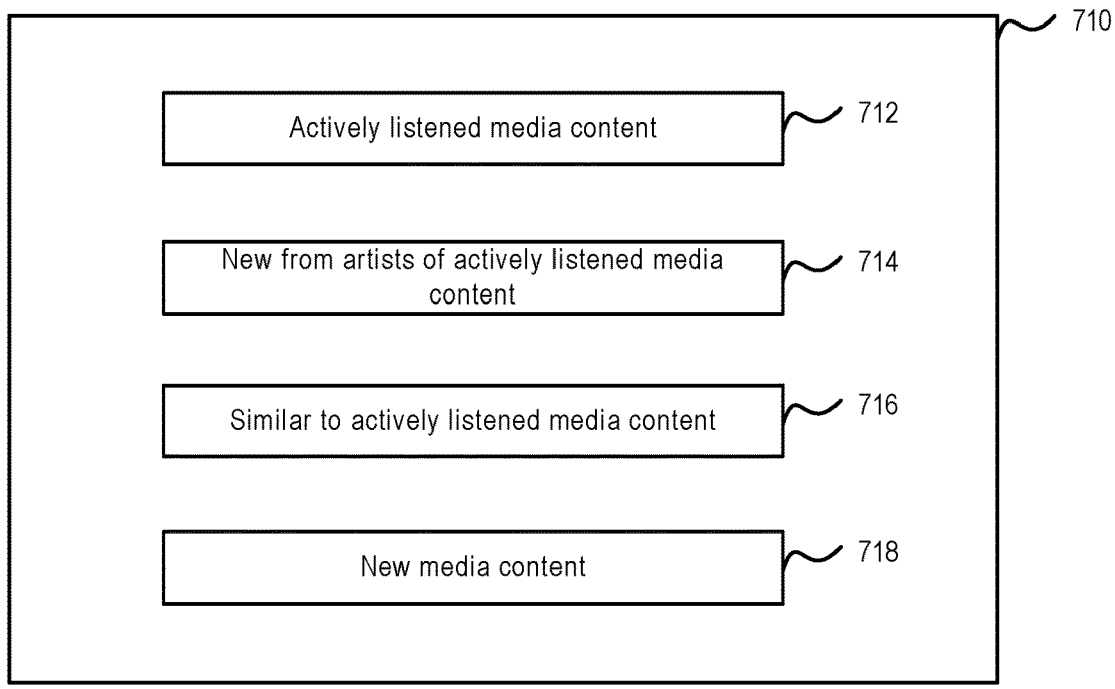
FIG. 16 shows another schematic illustration of an example corpus of media content.

A more specific example is given in FIG. 16. In this example, a universe 710 of media content is divided into pools 712, 714, 716, 718. Each of these pools has media content of specific attributes.

For example, the pool 712 includes media content that the user has previously viewed/listened to or otherwise indicated as being desirable. For example, the pool 712 can include tracks for songs from the user's personal media list.

The pool 714 includes media content from the same artists as the media content that is in pool 712. For example, assume that the user has viewed/listened to media content from artist A. The pool 714 can include other media content that the user has not yet viewed/listened to but is from the same artist A.

The pool 716 includes media content that is similar to the media content that the user has already viewed/listened to. For example, various artists can be clustered into different groups based upon similarity. The pool 716 can be populated with media content from artists that are similar to the artists that the user has already viewed/listened to media content from.

Finally, the pool 718 includes new media content. This new media content does not necessarily have a specified relationship with media content that the user has already viewed/listened to. Instead, the new media content is media content that is selected based upon other criteria, such as a relationship to selected media content attributed using artificial learning algorithms or other machine learning techniques.

For example, machine learning techniques can be used to select the media content in the pool 716. One such example technique is the word2vector tool that can be used to select media content based upon the user's playlists or other lists of media content. In this example, the word2vector tool is used to analyze the corpus of the user's existing media content in order to select new media content this is related. Specifically, the word2vector tool can be used to generate a resulting word vector file that is used by machine learning applications to select other media content that is similar to the media content that has already been viewed/listened to by the user. Other similar processes can also be used.

Figure 17:
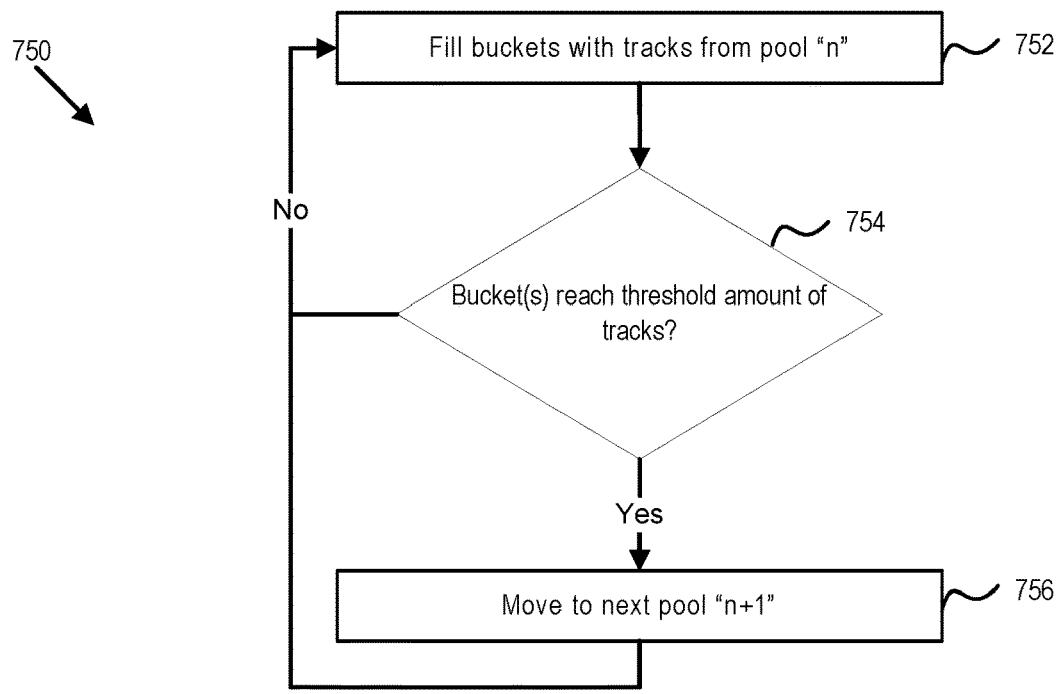
FIG. 17 shows an example method for filtering media content from pools into tempo buckets.

Referring now to FIG. 17, once the pools of media content are formed, the pools are used to populate playlists for the user based upon the tempo of each media content item. In this example, tempo search control engine 168 (and/or system 104) is programmed to place the media content into buckets representing various tempos, such as 140 beats per minute through 190 beats per minute. The buckets can be formed for each 5 beats, so that there are buckets for 140, 145, 150, 155 . . . 190 beats per minute. Other examples can be provided, such as various buckets for greater tempos (e.g., 195, 200, 205 . . . n beats per minute) or various different gradations (e.g., buckets for every beat, such as 140, 141, 142 . . . 190, or every ten beats, such as 140, 150, 160 . . . 190).

As shown in FIG. 17, one example process 750 for filling the buckets includes selecting a specific number of media content items from each pool and populating those items in each bucket. At operation 752, the buckets are filled with media content from a particular pool. Next, at operation 754, a determination is made regarding whether or not the buckets have reached a threshold amount. For example, a threshold can be set for each bucket for each type of media content from a particular pool. Once this threshold is reached for each bucket, control is passed to operation 756, and media content from the next pool ("n+1") is pulled. This process continues until the buckets are full and/or the media content from all of the pools is exhausted. If a particular bucket lacks a certain number of media content items when the process is completed, the remainder and/or the entire bucket can be populated with general purpose media content that has not been selected based upon the user's preferences. This assures that each bucket has at least a specified number of media content items to accommodate all of the desired tempos.

In the given example, the process 750 can be done as follows. First, the media content from the pool 712 (actively listened media content) is put into buckets by determining the tempo for each media content item (per the process described above) and assigning each media content item to the respective bucket. Next, the pool 714 (new media content from same artists) is distributed in the same manner. The process continues until each bucket reaches a threshold amount, such as 20 or 25 media content items for each bucket. In one example, the outer buckets 140, 190 have a threshold of 20 media content items, and the inner buckets 145-185 have a threshold of 25 media content items, so that more media content items are included at the inner buckets where it is more likely that tempos will be used more often (than at the extremes). Different threshold values can be used, such as different values for different buckets depending on the popularity of certain tempos (i.e., buckets having more popular tempos will have an increased number of items).

Once the media content is placed into the buckets, the ordering of the media content within each bucket can be defined using various methods. In one example, the media content from pool 712 is placed first, then media content from pool 714, etc. In this manner, the user gets media content at each tempo that means the most to the user. The user's playlist loops through the media content according to that order until exhausted. At that time, the loop can start over with the media content form the pool 712.

In another example, the media content is ordered in a more random manner. In one example, the order can be completely random without regard for which pool the media content originates. In another example, each media content item can be assigned a value, with the value being higher depending on the originating pool. This makes it more likely that a media content item from the pool 712 will be selected, but media content from the pool 718 can be selected too depending on the specific algorithm used. In other examples, other attributes can be used to select media content within a bucket, such as selecting media content to vary genres or highlight a certain genre.

In other examples, other filtering can be used. For example, limits on the number of media content items in each bucket can be imposed based upon criteria such as (in the instance of music), songwriter, singer, genre-type, etc. Such limits would assure that one or more buckets are not dominated by a single singer, thereby increasing variety for the user. Other filtering can be used.

The media content can be delivered to the user in various ways. In one example, the media content is delivered in chunks of five media content items. Other mechanisms can be used. Further, the pools can be updated at various stages, such as daily, weekly, etc. and the buckets repopulated accordingly. In this manner, the media content items do not become stale, and the user's changes in tastes can be accommodated.

As noted previously, although many of the examples provided above are described with respect to running, other embodiments relate to other repetitive motion activities as well such as cycling, swimming, and rowing.

This application is related to U.S. Ser. No. 62/163,927, filed on May 19, 2015, and to U.S. Ser. No. 14/883,295, filed on Oct. 14, 2015, both of which are entitled SEARCH MEDIA CONTENT BASED UPON TEMPO, and which applications are hereby incorporated by reference in their entireties.

The examples provided herein result in a more efficient system for managing and delivering media content items. For example, by placing the items into buckets, the items can be delivered more efficiently and on-demand by the system. Further, the methods and interfaces used to access the items can be optimized to allow the systems to function in near real-time to deliver the media content items for consumption.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following disclosure.

What is claimed is:

1. A media system, comprising:
   a media-playback device including:
      a media-output device that plays media content items;
      wherein the media-playback device is configured to:
         select media content items for playback during a repetitive-motion activity by sorting a universe of media content into buckets of tempos, and subsequently selecting the media content items from a bucket associated with a cadence of the repetitive-motion activity, the bucket generated by:
            filtering media content according to the repetitive-motion activity;
            placing each media content item from the filtered media content into two or more pools of media content, the two or more pools comprising:
               a first pool including media content that is from the filtered media content for the repetitive-motion activity and that a user has previously listened to using the media system; and
               a second pool including media content that is from the filtered media content for the repetitive-motion activity, and that the user has not previously listened to using the media system and is related to the media content in the first pool; and
            filling the bucket with media content selected from each of the two or more pools of media content, the selected media content having a range of tempos associated with the cadence, and wherein filling the bucket with media content from each of the two or more pools of media content includes:
               filling the bucket with media content from the first pool;
               determining whether a threshold amount of media content from the first pool is reached; and
               when the threshold amount of media content from the first pool is reached, filling the bucket with media content from the second pool.

2. The system of claim 1, wherein the two or more pools of media content include:
   a third pool having new media content that is from the filtered media content for the repetitive-motion activity and is not related to the media content in the first pool.

3. The system of claim 2, wherein media content from the two or more pools of media content is sorted into a plurality of buckets, each of the plurality of buckets representing a given tempo.

4. The system of claim 3, wherein each bucket increases in tempo by five beats per minute.

5. The system of claim 4, wherein media content within each bucket is ordered in importance.

6. The system of claim 5, wherein media content from the first pool is played before media content from the second pool.

7. The system of claim 1, wherein media content from the two or more pools of media content is sorted into a plurality of buckets, which each of the buckets representing a given tempo.

8. The system of claim 7, wherein media content within each bucket is ordered in importance.

9. The system of claim 8, wherein media content from the first pool is played before media content from the second pool.

10. The system of claim 1, wherein the media content in the second pool is related to the media content in the first pool by sharing at least one common characteristic with the media content in the first pool.

11. The system of claim 10, wherein the at least one common characteristic is an artist of the media content.

12. A media system, comprising:
    a media-playback device including a media-output device that plays media content items, the media-playback device configured to receive a selection of a desired tempo; and
    a server configured to:
       select media content items for playback by the media-output device during a repetitive-motion activity by sorting a universe of media content into buckets of tempos, and subsequently selecting the media content items from a bucket associated with a cadence of the repetitive-motion activity, the bucket generated by:
          filtering media content according to the repetitive-motion activity;
          placing each media content item from the filtered media content into two or more pools of media content, the two or more pools comprising:
             a first pool including media content that is from the filtered media content for the repetitive-motion activity and that a user has previously listened to using the media system; and
             a second pool including media content that is from the filtered media content for the repetitive-motion activity, and that the user has not previously listened to using the media system and is related to the media content in the first pool; and
          filling the bucket with media content selected from each of the two or more pools of media content, the selected media content having a range of tempos associated with the cadence, and wherein filling the bucket with media content from each of the two or more pools of media content includes:
             filling the bucket with media content from the first pool;
             determining whether a threshold amount of media content from the first pool is reached; and
             when the threshold amount of media content from the first pool is reached, filling the bucket with media content from the second pool.

13. The system of claim 12, wherein the two or more pools of media content include:
    a third pool having new media content that is from the filtered media content for the repetitive-motion activity and is not related to the media content in the first pool.

14. The system of claim 13, wherein media content from the two or more pools of media content is sorted into a plurality of buckets, each of the plurality of buckets representing a given tempo.

15. The system of claim 14, wherein each bucket increases in tempo by five beats per minute.

16. The system of claim 15, wherein media content within each bucket is ordered in importance.

17. The system of claim 16, wherein media content from the first pool is played before media content from the second pool.

18. A method for selecting media content based upon tempo, the method comprising:
- selecting media content items for playback during a repetitive-motion activity by sorting a universe of media content into buckets of tempos, and subsequently selecting the media content items from a bucket associated with a cadence of the repetitive-motion activity, the bucket generated by:
  - filtering media content according to the repetitive-motion activity;
  - placing each media content item from the filtered media content into two or more pools of media content, the two or more pools comprising:
    - a first pool including media content that is from the filtered media content for the repetitive-motion activity and that a user has previously listened to using a media system; and
    - a second pool including media content that is from the filtered media content for the repetitive-motion activity, and that the user has not previously listened to using the media system and is related to the media content in the first pool; and
  - filling the bucket with media content selected from each of the two or more pools of media content, the selected media content having a range of tempos associated with the cadence, and wherein filling the bucket with media content from each of the two or more pools of media content includes:
    - filling the bucket with media content from the first pool;
    - determining whether a threshold amount of media content from the first pool is reached; and
    - when the threshold amount of media content from the first pool is reached, filling the bucket with media content from the second pool.

19. The method of claim 18, further comprising:
- creating a third pool having new media content that is from the filtered media content for the repetitive-motion activity and is not related to the media content in the first pool.

20. The method of claim 19, wherein media content from the two or more pools of media content is sorted into a plurality of buckets, each of the plurality of buckets representing a given tempo.

21. The method of claim 20, further comprising ordering media content within each bucket by importance.

22. The method of claim 21, further comprising playing media content from the first pool before media content from the second pool.

* * * * *